(12) United States Patent  
Tanaka

(10) Patent No.: US 11,013,001 B2  
(45) Date of Patent: May 18, 2021

(54) WIRELESS COMMUNICATION SYSTEM

(71) Applicant: FUJITSU LIMITED, Kawasaki (JP)

(72) Inventor: Yoshinori Tanaka, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/644,640

(22) Filed: Jul. 7, 2017

(65) Prior Publication Data

US 2017/0311327 A1  Oct. 26, 2017

Related U.S. Application Data

(63) Continuation of application No. PCT/JP2015/052410, filed on Jan. 28, 2015.

(51) Int. Cl.
*H04W 72/04* (2009.01)
*H04W 74/02* (2009.01)
(Continued)

(52) U.S. Cl.
CPC ....... *H04W 72/0453* (2013.01); *H04W 74/02* (2013.01); *H04W 74/0808* (2013.01);
(Continued)

(58) Field of Classification Search
CPC .............. H04W 72/042; H04W 16/14; H04W 74/0833; H04W 72/0453; H04W 72/1289;
(Continued)

(56) References Cited

U.S. PATENT DOCUMENTS

2007/0037548 A1  2/2007  Sammour et al.
2009/0075668 A1  3/2009  Rao
(Continued)

FOREIGN PATENT DOCUMENTS

CN  103596183 A  2/2014
RU  2 444 132 C2  2/2012
(Continued)

OTHER PUBLICATIONS

Extended European search report with supplementary European search report and the European search opinion ssued by the European Patent Office for corresponding European Patent Application No. 15879938.7, dated Dec. 21, 2017.
(Continued)

*Primary Examiner* — Rownak Islam
(74) *Attorney, Agent, or Firm* — Myers Wolin, LLC

(57) ABSTRACT

A wireless communication system includes a first communication device and multiple second communication devices. The first communication device includes a first transmitting unit that transmits control information to instruct a resource in a shared band to the second communication device by using a resource in a dedicated band. Each of the second communication devices includes a determining unit and a second transmitting unit. The determining unit determines whether the resource in the shared band is idle. When the resource in the shared band is idle, the second transmitting unit transmits data by using the resource in the shared band specified in the control information after transmitting a predetermined signal to the shared band. When receiving the predetermined signal from other second communication device, the second transmitting unit transmits data by using the resource in the shared band even when the resource in the shared band is busy.

7 Claims, 15 Drawing Sheets

(51) Int. Cl.
   H04W 74/08    (2009.01)
   H04W 72/12    (2009.01)
   H04B 17/345   (2015.01)
   H04W 16/14    (2009.01)
(52) U.S. Cl.
   CPC ....... *H04W 74/0833* (2013.01); *H04B 17/345* (2015.01); *H04W 16/14* (2013.01); *H04W 72/042* (2013.01); *H04W 72/1289* (2013.01)
(58) Field of Classification Search
   CPC ............. H04W 74/02; H04W 74/0808; H04B 17/345
   USPC ........................................................ 370/329
   See application file for complete search history.

(56)             References Cited

U.S. PATENT DOCUMENTS

| | | | |
|---|---|---|---|
| 2009/0196230 | A1 | 8/2009 | Kim et al. |
| 2009/0310503 | A1 | 12/2009 | Tenny et al. |
| 2010/0290406 | A1 | 11/2010 | Miki et al. |
| 2010/0323738 | A1* | 12/2010 | Aiba ............... H04L 5/0053 455/509 |
| 2012/0044922 | A1 | 2/2012 | Ishii |
| 2013/0294356 | A1 | 11/2013 | Bala et al. |
| 2013/0343288 | A1 | 12/2013 | Ratasuk et al. |
| 2014/0335876 | A1 | 11/2014 | Ratasuk et al. |
| 2014/0341018 | A1 | 11/2014 | Bhushan et al. |
| 2014/0341135 | A1* | 11/2014 | Bhushan .............. H04L 5/14 370/329 |
| 2015/0031382 | A1 | 1/2015 | Damnjanovic et al. |
| 2015/0049708 | A1* | 2/2015 | Damnjanovic ....... H04L 1/1812 370/329 |
| 2015/0063111 | A1* | 3/2015 | Merlin .............. H04L 47/12 370/235 |
| 2015/0103715 | A1* | 4/2015 | Chen ............. H04W 52/0209 370/311 |
| 2015/0139175 | A1 | 5/2015 | Ratasuk et al. |
| 2015/0208366 | A1 | 7/2015 | Papasakellariou et al. |
| 2015/0312941 | A1* | 10/2015 | Oh ................. H04W 74/0816 370/338 |
| 2015/0358968 | A1* | 12/2015 | Malladi ............. H04W 16/14 455/454 |
| 2016/0073344 | A1 | 3/2016 | Vutukuri et al. |
| 2016/0095110 | A1 | 3/2016 | Li et al. |
| 2017/0150382 | A1* | 5/2017 | Martin .............. H04W 16/14 |
| 2017/0164242 | A1* | 6/2017 | Zhang ............... H04W 28/26 |
| 2018/0007710 | A1 | 1/2018 | Tanaka |

FOREIGN PATENT DOCUMENTS

| | | |
|---|---|---|
| WO | 2012/040520 A1 | 3/2012 |
| WO | 2013/087835 A1 | 6/2013 |
| WO | 2013/167748 A1 | 11/2013 |
| WO | 2016/081375 A1 | 5/2016 |

OTHER PUBLICATIONS

Hitachi Ltd., "Design targets for LAA using LTE", Agenda Item: 7.3.2.2, 3GPP TSG RAN WG1 Meeting #78bis, R1-144221, Ljubljana, Slovenia, Oct. 6-10, 2014.
Office Action and Examination Search Report issued by The Canadian Intellectual Property Office for corresponding Canadian Patent Application No. 2,975,241, dated May 29, 2018.
Ratasuk et al., "License-exempt LTE deployment in heterogeneous network" IEEE copyright 2012.
International Search Report with Written Opinion of the International Searching Authority issued for corresponding International Patent Application No. PCT/JP2015/052410, dated Apr. 7, 2015, with English translation.
LG Electronics, "Candidate solutions for LAA operation", Agenda Item: 7.3.2.2, 3GPP TSG-RAN WG1 Meeting #78bis, R1-144042, Ljubljana, Slovenia, Oct. 6-10, 2014.

Notice of Preliminary Rejection issued by the Korean Intellectual Property Office for corresponding Korean Patent Application No. 10-2017-7020946, dated Oct. 19, 2018, with an English translation.
Non-Final Office Action issued by the United States Patent and Trademark Office for corresponding U.S. Appl. No. 15/703,606, electronically delivered on Jun. 1, 2018.
Final Office Action issued by the United States Patent and Trademark Office for corresponding U.S. Appl. No. 15/703,606, electronically delivered on Dec. 13, 2018.
Office Action issued by Rospatent Federal Service for Intellectual Property for corresponding Russian Patent Application No. 2017135272108(061619), dated Aug. 24, 2018, with an English translation.
Notice of Preliminary Rejection issued by the Korean Intellectual Property Office for corresponding Korean Patent Application No. 10-2017-7027665, dated Sep. 27, 2018, with an English translation.
Fujitsu, "Design of LAA UL transmission", Agenda Item: 7.2.3.3, 3GPP TSG-RAN WG1 Meeting #80, R1-150186, Athens, Greece, Feb. 9-13, 2015.
Interdigital Communications, "On design targets and supported functionality for LTE LAA", Agenda Item: 7.3.2.2, 3GPP TSG-RAN WG1 Meeting #78bis, R1-144219, Ljubljana, Slovenia, Oct. 6-10, 2014.
Interdigital Communications, "On L1 design for LTE LAA DL only mode", Agenda Item: 6.3_2.2, 3GPP TSG RAN WG1 Meeting #79, R1-145052, San Francisco, USA, Nov. 17-21, 2014.
International Search Report issued for corresponding International Patent Application No. PCT/JP2015/060770, dated Jun. 30, 2015, with an English translation.
Office Action issued by the Canadian Intellectual Property Office for corresponding Canadian Patent Application No. 2,980,984, dated Apr. 4, 2018.
3GPP TS 36.212 V8.6.0, "3rd Generation Partnership Project; Technical Specification Group Radio Access Network; Evolved Universal Terrestrial Radio Access (E-UTRA); Multiplexing and channel coding (Release 8)", Mar. 2009.
3GPP TS 36.213 V8.6.0, "3rd Generation Partnership Project; Technical Specification Group Radio Access Network; Evolved Universal Terrestrial Radio Access (E-UTRA); Physical layer procedures (Release 8)", Mar. 2009.
3GPP TS 36.321 V8.5.0, "3rd Generation Partnership Project; Technical Specification Group Radio Access Network; Evolved Universal Terrestrial Radio Access (E-UTRA) Medium Access Control (MAC) protocol specification (Release 8)", Mar. 2009.
3GPP TS 36.133 V8.5.0, "3rd Generation Partnership Project; Technical Specification Group Radio Access Network; Evolved Universal Terrestrial Radio Access (E-UTRA); Requirements for support of radio resource management (Release 8)", Mar. 2009.
Extended European search report with supplementary European search report and the European search opinion ssued by the European Patent Office for corresponding European Patent Application No. 15888423.9, dated Feb. 26, 2018.
ZTE: "Analysis on potential issues and solutions for LAA UL transmission", Agenda Item: 2.2, 3GPP TSG RAN WG1 ad-hoc Meeting, R1-151027, Paris, France, Mar. 24-26, 2015.
Fujitsu: "Design of LAA UL transmission", Agenda Item: 2.2, 3GPP TSG RAN WG1 Ad-hoc Meeting, R1-150987, Paris, France, Mar. 24-26, 2015.
ZTE: "Design on reservation signal for LAA", Agenda Item: 2.2, 3GPP TSG RAN WG1 Ad-hoc Meeting, R1-151025, Paris, France, Mar. 24-26, 2015.
Non-Final Office Action issued by the United States Patent and Trademark Office for corresponding U.S. Appl. No. 15/703,606, electronically delivered on May 3, 2019.
Final Office Action issued by the USPTO for corresponding U.S. Appl. No. 15/703,606, dated Sep. 30, 2019.
Office Action issued by Intellectual Property India for corresponding Indian Patent Application No. 201737032724, dated Jan. 27, 2020, with an English translation.
First Notification of Office Action issued by the China National Intellectual Property Administration for corresponding Chinese Patent Application No. 201580078594.0, dated Jul. 3, 2020, with full English translation attached.

(56) References Cited

OTHER PUBLICATIONS

First Office Action issued by the China National Intellectual Property Administration for corresponding Chinese Patent Application No. 201580074766.7, dated Apr. 1, 2020, with English translation.
Wang et al., "Attached-RTS: Eliminating an Exposed Terminal Problem in Wireless Networks", IEEE Transactions on Parallel and Distributed Systems, vol. 24, No. 7, pp. 1289-1299, Jul. 2013.
Examination Report issued by Intellectual Property India for corresponding Indian Patent Application No. 201737026343, dated Dec. 23, 2020, with an English translation.
The Second Notification of Office Action issued by the China National Intellectual Property Administration for the corresponding Japanese Patent Application No. 201580074766.7, dated Aug. 24, 2020, with a full English translation.

* cited by examiner

WIRELESS COMMUNICATION SYSTEM

CROSS-REFERENCE TO RELATED APPLICATION

This application is a continuation application of International Application PCT/JP2015/052410, filed on Jan. 28, 2015, and designating the U.S., the entire contents of which are incorporated herein by reference.

FIELD

The present invention relates to a wireless communication system, a base station device, and a terminal device.

BACKGROUND

In recent years, it has been discussed about a next generation wireless communication technology to further increase the speed, the capacity, and the like in wireless communication in a wireless communication system such as a mobile telephone system. For example, in the communication standard called LTE (Long Term Evolution), a technique of performing communication by using a carrier wave of a frequency band requiring a license (LC: Licensed Band Carrier) and a carrier wave of a frequency band not requiring a license (UC: Unlicensed Band Carrier) has been contemplated. The technique is called LAA (Licensed Assisted Access).

In LAA, when a terminal device is to perform uplink transmission to a base station device, the base station device transmits a UL (UpLink) grant to request data transmission to the terminal device through a licensed band. When receiving the UL grant from the base station device through the licensed band, the terminal device performs LBT (listen before talk) to perform carrier sense in an unlicensed band. When the resource in the unlicensed band specified in the UL grant is idle, the terminal device transmits data to the base station by using the resource in the unlicensed band specified in the UL grant. Prior art examples are disclosed in R. Ratasuk, M. Uusitalo, N. Mangalvedhe, A. Sorri, S. Iraji, C. Wijting, and A. Ghosh, "*License-Exempt LTE Deployment in Heterogeneous Network*", Proceeding of International Symposium on Wireless Communication Systems (ISWCS) 2012, August 2012.

The unlicensed band is also used by other LTE companies or in other systems such as a wireless LAN. Therefore, when the terminal device transmits data, the unlicensed band that is specified in the UL grant received from the base station device is not necessarily idle. Accordingly, when the unlicensed band that is specified in the UL grant received from the base station device is busy, the terminal device does not perform transmission. Thus, the throughput in the uplink from the terminal device to the base station device decreases.

SUMMARY

A wireless communication system disclosed in this application, according to an aspect, includes a first communication device and a plurality of second communication devices. The first communication device and the second communication devices wirelessly communicate with each other by using a dedicated band that is dedicated to own system, and a shared band that is shared with other systems. The first communication device includes a first transmitting unit that transmits control information that instructs a resource in the shared band to transmit data to the second communication device, by using a resource in the dedicated band. Each of the second communication devices includes a determining unit and a second transmitting unit. The determining unit determines whether the resource in the shared band is idle or busy. The second transmitting unit transmits, when the determining unit determines that the resource in the shared band is idle, data by using the resource in the shared band instructed in the control information after transmitting a predetermined signal indicating start of data transmission to the shared band. The second transmitting unit transmits, when receiving the predetermined signal from other second communication device through the resource in the shared band, data by using the resource in the shared band instructed in the control information even when the determining unit determines that the resource in the shared band is busy.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Embodiments of a wireless communication system, a base station device, and a terminal device disclosed in the present application are explained in detail below based on the drawings. The following embodiments are not intended to limit the disclosed technique. Moreover, the respective embodiments can be appropriately combined within a range not causing a contradiction in the processing.

First Embodiment

[Wireless Communication System 10]

Figure 1:
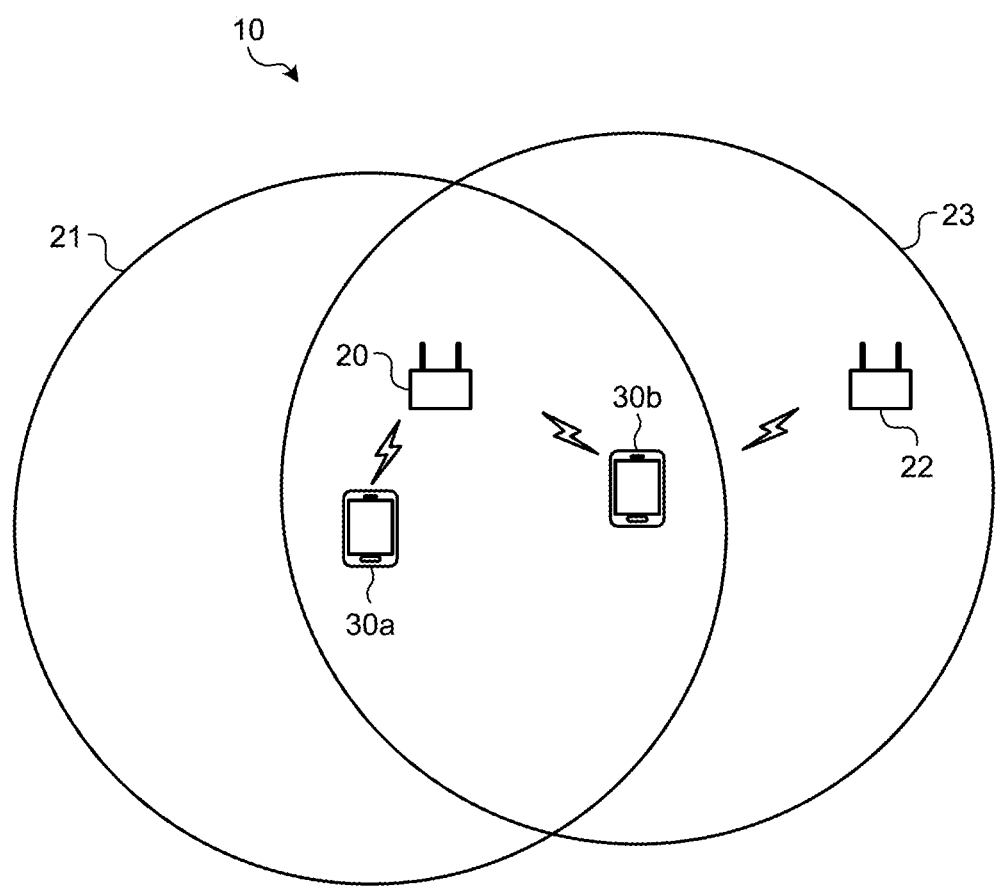
FIG. 1 is a diagram illustrating one example of a wireless communication system.

FIG. 1 is a diagram illustrating one example of a wireless communication system 10. The wireless communication system 10 includes a base station device 20, a base station device 22, a terminal device 30a, and a terminal device 30b. In the following, when the terminal device 30a and the terminal device 30b are collectively referred without distinguishing from each other, it is described as a terminal device 30.

The base station device 20 performs wireless communication, for example, based on LTE. The base station device 20 is, for example, eNB (evolved Node B) in LTE. Each of the terminal devices 30 is, for example, UE (User Equipment) in LTE. The terminal device 30a and the terminal device 30b belong to the same cell that is managed by the base station device 20, and communicate with the base station device 20 in the cell. In the following explanation, the base station device 20 and the terminal device 30 are described as LTE system in some cases. The base station device is one example of a first communication device, and the terminal device 30 is one example of a second communication device.

The base station device 22 is a base station device that belongs to a system different from the LTE system to which, for example, the base station device 20 belongs. The base station device 22 is a base station device that belongs to an LTE system of a company different from the LTE system to which, for example, the base station device 20 belongs, or a base station device that belongs to another communication system such as a wireless LAN system.

The base station device 20 performs wireless communication with the terminal device 30 in the cell, by using a first band dedicated to the LTE system to which the base station device 20 belongs, and a second band that is shared by the LTE system to which the base station device 20 belongs and other systems. The first band is a band in which wireless communication is performed by using an LC (Licensed band Carrier) of, for example, 2 GHz band. The second band is a band in which wireless communication is performed by using a UC (Unlicensed band Carrier) of, for example, 5 GHz band. In the following, the first band is referred to as licensed band, and the second band is referred to as unlicensed band.

In the LTE system to which the base station device 20 belongs, the first band is allocated to, for example, a PCC (Primary Component Carrier), and the second band is allocated to, for example, an SCC (Secondary Component Carrier). In the present embodiment, the first band is a dedicated band to the LTE system to which the base station device 20 belongs, while the second band is a shared band that is shared by the LTE system to which the base station device 20 belongs and the system to which the base station device 22 belongs.

Moreover, in FIG. 1, a numerical symbol 21 indicates a range of a radio wave transmitted from any device reaching at the intensity that is determined as busy by the carrier sense of the terminal device 30a. Furthermore, a numerical symbol 23 indicates a range of a radio wave transmitted from any device reaching at the intensity that is determined as busy by the carrier sense of the terminal device 30b.

When the terminal device 30 transmits data in an unlicensed band, the base station device 20 transmits a UL grant to the terminal device 30 in a licensed band. The terminal device 30 that has received the UL grant performs the LBT in an unlicensed band. When the unlicensed band is determined to be idle, the terminal device 30 performs data transmission by using a resource of the unlicensed band that is specified in the UL grant.

In the example illustrated in FIG. 1, when the base station device 20 is not transmitting a radio wave and the base station device 22 is transmitting a radio wave in the unlicensed band, the terminal device 30a determines that the unlicensed band is idle. Therefore, when the base station device 20 is not transmitting a radio wave in the unlicensed band, the terminal device 30a can transmit data using the resource of the unlicensed band that is specified by the received UL grant.

On the other hand, in the example illustrated in FIG. 1, when the base station device 22 is transmitting a radio wave in the unlicensed band, the terminal device 30b determines that the unlicensed band is busy as a result of the carrier sense. As data transmission is performed in the unlicensed band only when the unlicensed band is idle, the terminal device 30b does not perform data transmission while the base station device 22 is transmitting a radio wave in the unlicensed band. Therefore, the throughput in the uplink from the terminal device 30b to the base station device 20 decreases.

On the other hand, in the wireless communication system 10 of the present embodiment, when any one of the terminal devices 30 that belong to the same cell determines that the unlicensed band is idle by the carrier sense, the terminal device 30 transmits a predetermined signal indicating start of data transmission. In the present embodiment, the predetermined signal is, for example, a CTS (Clear To Send) signal. After transmission of the CTS signal, the terminal device 30 starts data transmission in the unlicensed band.

On the other hand, the other one of the terminal devices 30 that has received the CTS signal from one of the terminal devices 30 belonging to the same cell starts data transmission in the unlicensed band even when it is determined that the unlicensed band is busy by the carrier sense. Thus, the reduction of the throughput in uplink can be eased.

A case in which two units of the terminal devices 30 belonging to the same cell perform data transmission is considered. When one of the terminal devices 30 detects an unlicensed band by carrier sense and starts data transmission, the other one of the terminal devices 30 determines that the unlicensed band is busy due to a radio wave from one of the terminal devices 30. Thus, the other one of the terminal devices 30 suspends data transmission until the transmission by the one of the terminal devices 30 is finished.

The unlicensed band is divided into multiple sub-bands, and the base station device 20 allocates different sub-bands to the respective subordinate terminal devices 30. The base station device 20 separates signals transmitted from the terminal device 30 in different sub-bands per sub-band, and demodulates and decodes the signals. Therefore, when the terminal devices 30 belonging to the same cell performs transmission by using a resource of the unlicensed band that is specified by the base station device 20, the base station device 20 can demodulate and decode the signals transmitted from the respective terminal devices 30.

However, as illustrated in FIG. 1, when the terminal device 30 performs transmission in an unlicensed band when the unlicensed band is determined to be busy due to a radio wave from the base station device 22 belonging to another system, it can affect a reception operation of the base station device 22. Therefore, when the terminal device 30 that has determined that the unlicensed band is busy transmits data in response to reception of the CTS signal, the data transmission is performed by a transmission power that is controlled so as to reduce the influence on the reception operation of the base station device 22. Thus, influence on a reception operation of another system that is performing transmission and reception in the unlicensed band can be reduced.

[Base Station Device 20]

Figure 2:
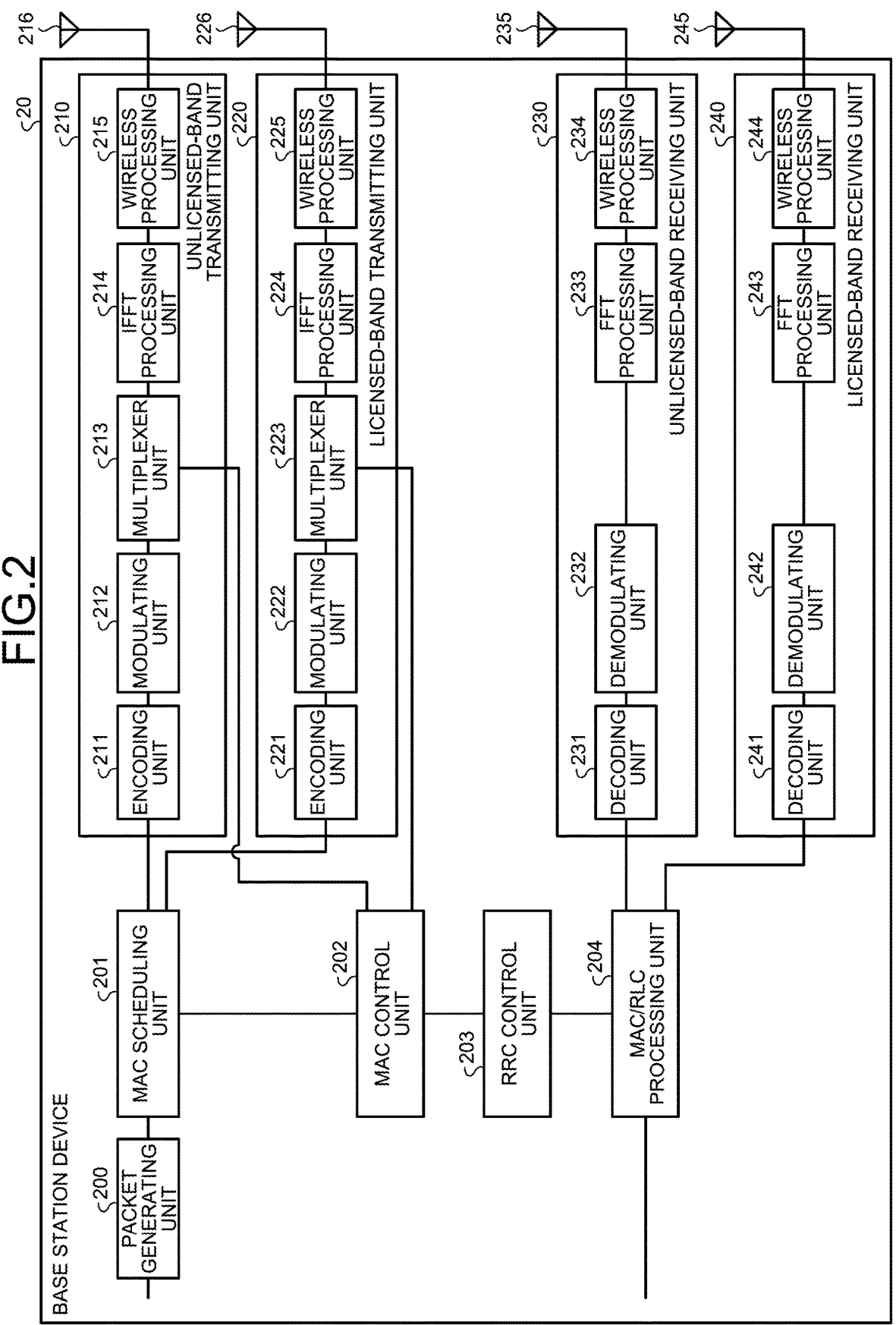
FIG. 2 is a block diagram illustrating one example of a base station device in a first embodiment.

FIG. 2 is a block diagram illustrating one example of the base station device 20 in the first embodiment. The base station device 20 includes a packet generating unit 200, a MAC (Media Access Control) scheduling unit 201, a MAC control unit 202, an RRC (Radio Resource Control) control unit 203, and a MAC/RLC (Radio Link Control) processing unit 204. Moreover, the base station device 20 includes an unlicensed-band transmitting unit 210, a licensed-band transmitting unit 220, an unlicensed-band receiving unit 230, a licensed-band receiving unit 240, an antenna 216, an antenna 226, an antenna 235, and an antenna 245. Note that the antenna 216, the antenna 226, the antenna 235, and the antenna 245 can be implemented by a single antenna.

The licensed-band receiving unit 240 performs processing of decoding data from a signal received in an unlicensed band. The licensed-band receiving unit 240 includes a decoding unit 241, a demodulating unit 242, an FFT processing unit 243, and a wireless processing unit 244.

The wireless processing unit 244 performs wireless processing of a signal received through the antenna 245. The wireless processing performed by the wireless processing unit 244 includes processing of converting, for example, a frequency of a reception signal from a licensed band to a base band. The wireless processing unit 244 outputs the reception signal subjected to the wireless processing to the FFT processing unit 243.

The FFT processing unit 243 performs FFT (Fast Fourier Transform) processing on the reception signal output from the wireless processing unit 244. Thus, the reception signal that has been frequency-transformed from the licensed band to the base band is transformed from a time region to a frequency region. The FFT processing unit 243 outputs the reception signal subjected to the FFT processing to the demodulating unit 242.

The demodulating unit 242 demodulates the reception signal output from the FFT processing unit 243. The demodulating unit 242 outputs the reception signal subjected to demodulation to the decoding unit 241. The decoding unit 241 decodes the reception signal output from the demodulating unit 242. The decoding unit 241 outputs decoded data to the MAC/RLC processing unit 204.

The unlicensed-band receiving unit 230 performs processing of decoding data from a signal received in the unlicensed band. The unlicensed-band receiving unit 230 includes a decoding unit 231, a demodulating unit 232, an FFT processing unit 233, and a wireless processing unit 234.

The wireless processing unit 234 performs wireless processing of a signal received through the antenna 235. The wireless processing performed by the wireless processing unit 234 includes processing of converting, for example, a frequency of a reception signal from an unlicensed band to a base band. The wireless processing unit 234 outputs the reception signal subjected to the wireless processing to the FFT processing unit 233.

The FFT processing unit 233 performs FFT processing on the reception signal output from the wireless processing unit 234. Thus, the reception signal that has been frequency-transformed from the unlicensed band to the base band is transformed from a time region to a frequency region. The FFT processing unit 233 outputs the reception signal subjected to the FFT processing to the demodulating unit 232.

The demodulating unit 232 demodulates the reception signal output from the FFT processing unit 233. The demodulating unit 232 then outputs the reception signal subjected to demodulation to the decoding unit 231. The decoding unit 231 decodes the reception signal output from the demodulating unit 232. The decoding unit 231 outputs decoded data to the MAC/RLC processing unit 204.

The MAC/RLC processing unit 204 performs processing in a MAC layer and processing in an RLC layer based on the data output from the decoding unit 231 and the decoding unit 241. The MAC/RLC processing unit 204 outputs data that is obtained by the processing of each layer to a device that performs processing of a higher-level layer of the base station device 20, for example. Furthermore, the MAC/RLC processing unit 204 outputs the control information included in the data obtained by the processing of each layer to the RRC control unit 203. Moreover, when the CTS signal is included in the data output from the unlicensed-band receiving unit 230 the MAC/RLC processing unit 204 waits for data to be transmitted from the terminal device 30 in the unlicensed band following the CTS signal.

The RRC control unit 203 performs wireless resource control based on control information that is output from the MAC/RLC processing unit 204. The wireless resource control performed by the RRC control unit 203 is processing in the RRC layer. The RRC control unit 203 generates control information based on the wireless resource control, and outputs the generated control information to the MAC control unit 202.

The MAC control unit 202 performs control of the MAC layer based on the control information output from the RRC control unit 203. Moreover, the MAC control unit 202 generates a UL grant to request data transmission when a data transmission request to the terminal device 30 is issued. The MAC control unit 202 outputs the generated UL grant to a multiplexer unit 223 described later. The UL grant includes information, for example, about a sub-band of the unlicensed band to be used when the terminal device 30 transmits data, a transmission start timing, a back-off value, a minimum transmission power, and the like.

Furthermore, the MAC control unit 202 generates a control signal that includes a signal such as a DMRS (Data Demodulation Reference Signal) based on the control of the MAC layer, and outputs the generated control signal to a multiplexer unit 213 described later. Moreover, the MAC control unit 202 generates control information based on the control of the MAC layer, and outputs the generated control information to the MAC scheduling unit 201.

The packet generating unit 200 generates a packet including user data that is output from a device performing processing of a higher-level layer. The packet generating unit 200 then outputs the generated packet to the MAC scheduling unit 201.

The MAC scheduling unit 201 performs scheduling in the MAC layer for a packet output from the packet generating unit 200 based on the control information output from the MAC control unit 202. The MAC control scheduling unit 201 outputs the packet based on a result of the scheduling, to the unlicensed-band transmitting unit 210 or to the licensed-band transmitting unit 220. The MAC scheduling unit 201 performs the scheduling such that transmission of a data signal is performed, for example, in a subframe unit. That is, the MAC scheduling unit 201 performs the scheduling of a packet such that a length of a data signal transmitted in the licensed band matches with a subframe period.

The licensed-band transmitting unit 220 performs processing of transmitting data in the licensed band. The licensed-band transmitting unit 220 includes an encoding unit 221, a modulating unit 222, the multiplexer unit 223, an IFFT (Inverse Fast Fourier Transform) processing unit 224, and a wireless processing unit 225.

The encoding unit 221 encodes data of the packet output from the MAC scheduling unit 201. An encoding unit 211 then outputs the encoded data of the packet to the modulating unit 222. The modulating unit 222 modulates the data output from the encoding unit 221. The modulating unit 222 then outputs the signal subjected to modulation to the multiplexer unit 223.

The multiplexer unit 223 multiplexes the signal of the control information such as the UL grant output from the MAC control unit 202, and the signal output from the modulating unit 222. The multiplexer unit 223 then outputs the multiplexed transmission signal to the IFFT processing unit 224.

The IFFT processing unit 224 performs IFFT processing on the transmission signal output from the multiplexer unit 223. Thus, the transmission signal output from the multiplexer unit 223 is converted from a frequency region to a time region. The IFFT processing unit 224 outputs the transmission signal subjected to the IFFT processing to the wireless processing unit 225.

The wireless processing unit 225 performs wireless processing on the transmission signal output from the IFFT processing unit 224. The wireless processing performed by the wireless processing unit 225 includes, for example, processing of converting a frequency of the transmission signal from the base band to the licensed band. The wireless processing unit 225 transmits the transmission signal subjected to the wireless processing through the antenna 226.

The unlicensed-band transmitting unit 210 performs processing of transmitting data in the unlicensed band. The unlicensed-band transmitting unit 210 includes the encoding unit 211, a modulating unit 212, the multiplexer unit 213, an IFFT processing unit 214, and a wireless processing unit 215.

The encoding unit 211 encodes data of the packet output from the MAC scheduling unit 201. The encoding unit 211 then outputs the encoded data of the packet to the modulating unit 212. The modulating unit 212 modulates the data of the packet output from the encoding unit 211. The modulating unit 212 then outputs the modulated signal to the multiplexer unit 213.

The multiplexer unit 213 multiplexes the signal such as the DMRS output from the MAC control unit 202, and the signal output from the modulating unit 212. The multiplexer unit 213 then outputs the multiplexed transmission signal to the IFFT processing unit 214.

The IFFT processing unit 214 performs IFFT processing on the transmission signal output from the multiplexer unit 213. Thus, the transmission signal output from the multiplexer unit 213 is converted from a frequency region to a time region. The IFFT processing unit 214 outputs the transmission signal subjected to the IFFT processing to the wireless processing unit 215.

The wireless processing unit 215 performs wireless processing on the transmission signal output from the IFFT processing unit 214. The wireless processing performed by the wireless processing unit 215 includes, for example processing of converting a frequency of the transmission signal from the base band to the unlicensed band. The wireless processing unit 215 transmits the transmission signal subjected to the wireless processing through the antenna 216.

[Terminal Device 30]

Figure 3:
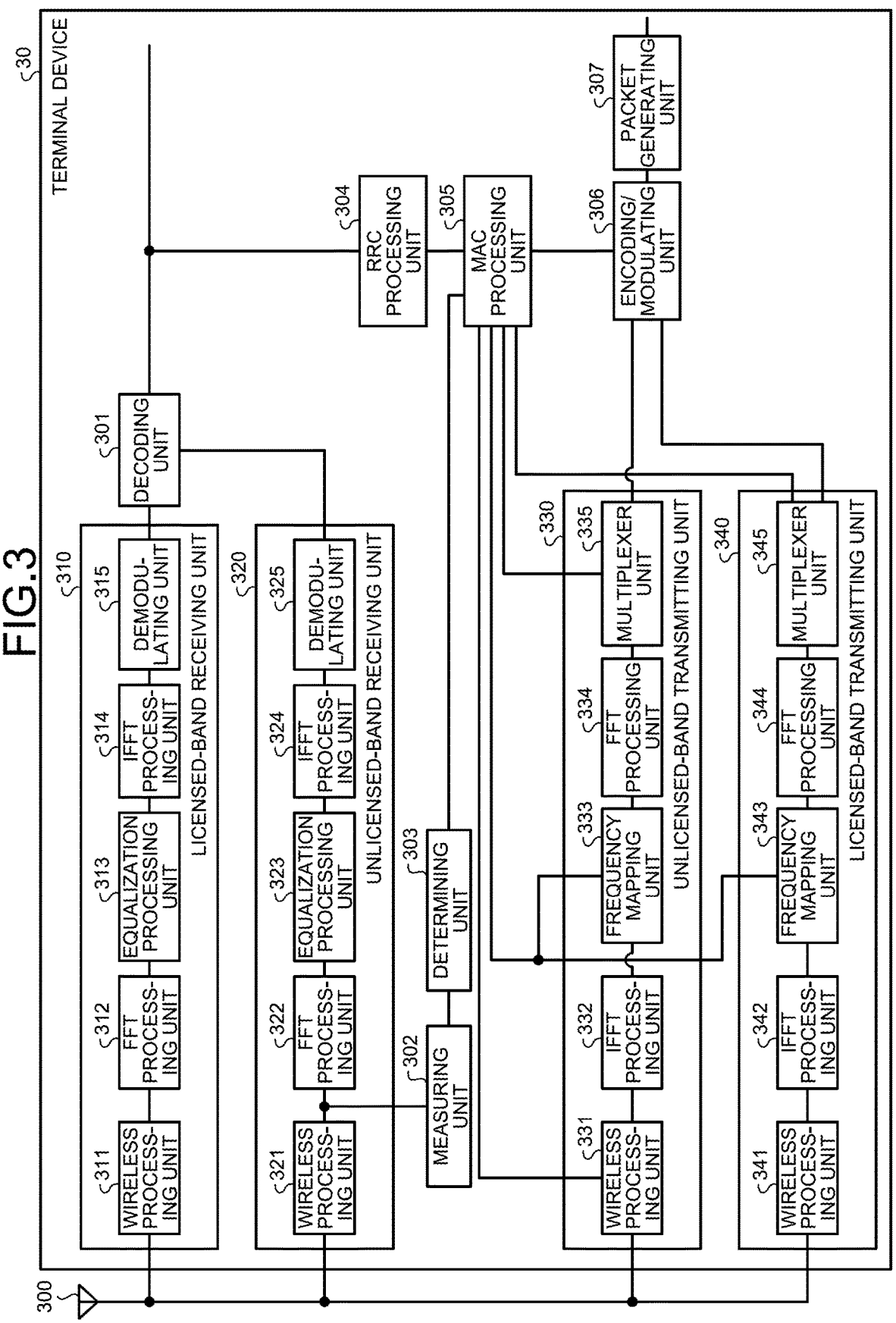
FIG. 3 is a block diagram illustrating one example of a terminal device in the first embodiment.

FIG. 3 is a block diagram illustrating one example of the terminal device 30 in the first embodiment. The terminal device 30 includes, as illustrated in FIG. 3, antenna 300, a decoding unit 301, a measuring unit 302, a determining unit 303, an RRC processing unit 304, a MAC processing unit 305, an encoding/modulating unit 306, and a packet generating unit 307. Furthermore, the terminal device 30 includes a licensed-band receiving unit 310, an unlicensed-band receiving unit 320, an unlicensed-band transmitting unit 330, and a licensed-band transmitting unit 340.

The antenna 300 can be provided independently to each of the licensed-band receiving unit 310, the unlicensed-band receiving unit 320, the unlicensed-band transmitting unit 330, and the licensed-band transmitting unit 340. Alternatively, the antenna 300 can be provided one for the licensed-band receiving unit 310 and the licensed-band transmitting unit 340, and one for the unlicensed-band receiving unit 320 and the unlicensed-band transmitting unit 330.

The licensed-band receiving unit 310 performs processing of demodulating data from a signal received in the licensed band. The licensed-band receiving unit 310 includes a wireless processing unit 311, an FFT processing unit 312, an equalization processing unit 313, an IFFT processing unit 314, and a demodulating unit 315.

The wireless processing unit 311 performs wireless processing on a signal received through the antenna 300. The wireless processing performed by the wireless processing unit 311 includes processing of converting, for example, a frequency of a reception signal from a licensed band to a base band. The wireless processing unit 311 outputs the reception signal subjected to the wireless processing to the FFT processing unit 312.

The FFT processing unit 312 performs FFT processing on the reception signal output from the wireless processing unit 311. Thus, the reception signal that output from the wireless processing unit 311 is transformed from a time region to a frequency region. The FFT processing unit 312 outputs the reception signal subjected to the FFT processing to the equalization processing unit 313. The equalization processing unit 313 performs equalization processing on the signal output from the FFT processing unit 312. The equalization processing unit 313 outputs the reception signal subjected to the equalization processing to the IFFT processing unit 314.

The IFFT processing unit 314 performs IFFT processing on the reception signal output from the equalization processing unit 313. Thus, the reception signal output from the equalization processing unit 313 is transformed from a frequency region to a time region. The IFFT processing unit 314 outputs the reception signal subjected to the IFFT processing to the demodulating unit 315.

The demodulating unit 315 demodulates the reception signal output from the IFFT processing unit 314. The demodulating unit 315 then outputs the demodulated reception signal to the decoding unit 301. The data decoded from the reception signal demodulated by the licensed-band receiving unit 310 includes control information such as the UL grant and the CTS signal.

The unlicensed-band receiving unit 320 performs processing of demodulating data from the signal received in the unlicensed band. The unlicensed-band receiving unit 320 includes a wireless processing unit 321, an FFT processing unit 322, an equalization processing unit 323, an IFFT processing unit 324, and a demodulating unit 325.

The wireless processing unit 321 performs wireless processing on the signal received through the antenna 300. The wireless processing performed by the wireless processing unit 321 includes processing of converting, for example, a frequency of a reception signal from an unlicensed band to a base band. The wireless processing unit 321 outputs the reception signal subjected to the wireless processing to the FFT processing unit 322 and the measuring unit 302.

The FFT processing unit 322 performs FFT processing on the reception signal output from the wireless processing unit 321. Thus, the reception signal is output from the wireless processing unit 321 is transformed from a time region to a frequency region. The FFT processing unit 322 then outputs the reception signal subjected to the FFT processing to the equalization processing unit 323. The equalization processing unit performs equalization processing on the reception signal output from the FFT processing unit 322. The equalization processing unit 323 outputs the reception signal subjected to the equalization processing to the IFFT processing unit 324.

The IFFT processing unit 324 performs IFFT processing on the reception signal output from the equalization processing unit 323. Thus, the reception signal output from the equalization processing unit 323 is transformed from a frequency region to a time region. The IFFT processing unit 324 outputs the reception signal subjected to the IFFT processing to the demodulating unit 325. The demodulating unit 325 demodulates the reception signal output from the IFFT processing unit 324. The demodulating unit 325 then outputs the demodulated reception signal to the decoding unit 301.

The decoding unit 301 decodes user data and control information from the reception signal output from the licensed-band receiving unit 310 and the unlicensed-band receiving unit 320. The decoding unit 301 outputs the decoded user data, for example, to an application processing unit (not illustrated) that performs processing based on the received data. Moreover, the decoding unit 301 outputs the decoded control information to the RRC processing unit 304. The control information output to the RRC processing unit 304 includes the UL grant, the CTS signal, and the like.

The RRC processing unit 304 performs processing of the RRC layer based on the control information output from the decoding unit 301. The RRC processing unit 304 then outputs a result of processing of the RRC layer to the MAC processing unit 305. Furthermore, the RRC processing unit 304 outputs the control information such as the UL grant and the CTS signal to the MAC processing unit 305.

The measuring unit 302 measures an interference power in the unlicensed band based on the reception signal output from the wireless processing unit 321. The measuring unit 302 then outputs a result of measurement of the interference power to the determining unit 303.

The determining unit 303 determines whether the unlicensed band is idle or busy based on the result of measurement output from the measuring unit 302. The determining unit 303 determines that the unlicensed band is idle, for example, when an interference power measured by the measuring unit 302 is smaller than a predetermined threshold. On the other hand, the determining unit 303 determines that the unlicensed band is busy when the interference power measured by the measuring unit 302 is equal to or larger than the predetermined threshold. The determining unit 303 then outputs a result of determination to the MAC processing unit 305 together with the result of measurement output from the measuring unit 302.

The MAC processing unit 305 performs processing of the MAC layer based on the processing result output from the RRC processing unit 304 and the result of determination output from the determining unit 303. The MAC processing unit 305 then outputs a signal such as DMRS to a multiplexer unit 345 based on the processing of the MAC layer. Moreover, the MAC processing unit 305 outputs a dummy signal, the CTS signal, and the like to a multiplexer unit 335 based on the processing of the MAC layer.

Furthermore, the MAC processing unit 305 outputs allocation information of wireless resources to a frequency mapping unit 333 and a frequency mapping unit 343 described later based on the processing of the MAC layer. Moreover, the MAC processing unit 305 outputs allocation information of wireless resource generated by the RRC processing unit 304 to the encoding/modulating unit 306 described later. Furthermore, the MAC processing unit 305 confirms whether the unlicensed band in which the base station device 20 performs communication is busy based on the result of determination output from the determining unit 303.

The packet generating unit 307 generates a packet that includes user data output from, for example, the application processing unit (not illustrated). The packet generating unit 307 then outputs the generated packet to the encoding/modulating unit 306.

The encoding/modulating unit 306 performs processing of coding and modulating on the packet output from the packet generating unit 307. The encoding/modulating unit 306 then outputs a signal subjected to the processing of coding and modulating to the unlicensed-band transmitting unit 330 or the licensed-band transmitting unit 340 based on the allocation information of wireless resources output from the MAC processing unit 305.

The licensed-band transmitting unit 340 performs processing of transmitting data in the licensed band. The licensed-band transmitting unit 340 includes a wireless processing unit 341, an IFFT processing unit 342, the frequency mapping unit 343, an FFT processing unit 344, and the multiplexer unit 345.

The multiplexer unit 345 multiplexes each signal output from the MAC processing unit 305 and a signal output from the encoding/modulating unit 306. The multiplexer unit 345 then outputs the multiplexed transmission signal to the FFT processing unit 344.

The FFT processing unit 344 performs FFT processing on the transmission signal output from the multiplexer unit 345. Thus, the transmission signal output from the multiplexer unit 345 is converted from a time region to a frequency region. The FFT processing unit 344 outputs the transmission signal subjected to the FFT processing to the frequency mapping unit 343.

The frequency mapping unit 343 performs frequency mapping on the transmission signal output from the FFT processing unit 344 based on the allocation information of wireless resources output from the MAC processing unit 305. The frequency mapping unit 343 then outputs the transmission signal subjected to the frequency mapping to the IFFT processing unit 342.

The IFFT processing unit 342 performs IFFT processing on the transmission signal output from the frequency mapping unit 343. Thus, the transmission signal output from the frequency mapping unit 343 is converted from a frequency region to a time region. The IFFT processing unit 342 outputs the transmission signal subjected to the IFFT processing to the wireless processing unit 341.

The wireless processing unit 341 performs wireless processing on the transmission signal output from the IFFT processing unit 342. The wireless processing performed by the wireless processing unit 341 includes, for example, processing of converting a frequency of the transmission signal from the base band to the licensed band. The wireless processing unit 341 transmits the transmission signal subjected to the wireless processing through the antenna 300.

The unlicensed-band transmitting unit 330 performs processing of transmitting data in the unlicensed band. The unlicensed-band transmitting unit 330 includes a wireless processing unit 331, an IFFT processing unit 332, a frequency mapping unit 333, an FFT processing unit 334, and the multiplexer unit 335.

The multiplexer unit 335 multiplexes each signal output from the MAC processing unit 305 and a signal output from the encoding/modulating unit 306. The multiplexer unit 335 then outputs the multiplexed transmission signal to the FFT processing unit 334.

The FFT processing unit 334 performs FFT processing on the transmission signal output from the multiplexer unit 335. Thus, the transmission signal output from the multiplexer unit 335 is converted from a time region to a frequency region. The FFT processing unit 334 outputs the transmission signal subjected to the FFT processing to the frequency mapping unit 333.

The frequency mapping unit 333 performs frequency mapping on the transmission signal output from the FFT processing unit 334 based on the allocation information of wireless resources output from the MAC processing unit 305. The frequency mapping unit 333 then outputs the transmission signal subjected to the frequency mapping to the IFFT processing unit 332.

The IFFT processing unit 332 performs IFFT processing on the transmission signal output from the frequency mapping unit 333. Thus, the transmission signal output from the frequency mapping unit 333 is converted from a frequency region to a time region. The IFFT processing unit 332 outputs the transmission signal subjected to the IFFT processing to the wireless processing unit 331.

The wireless processing unit 331 performs wireless processing on the transmission signal output from the IFFT processing unit 332. The wireless processing performed by the wireless processing unit 331 includes, for example, processing of converting a frequency of the transmission signal from the base band to the unlicensed band, and processing of controlling a transmission power according to an instruction from the MAC processing unit 305. The wireless processing unit 331 transmits the transmission signal subjected to the wireless processing through the antenna 300.

[Operation of Wireless Communication System 10]

Figure 4:
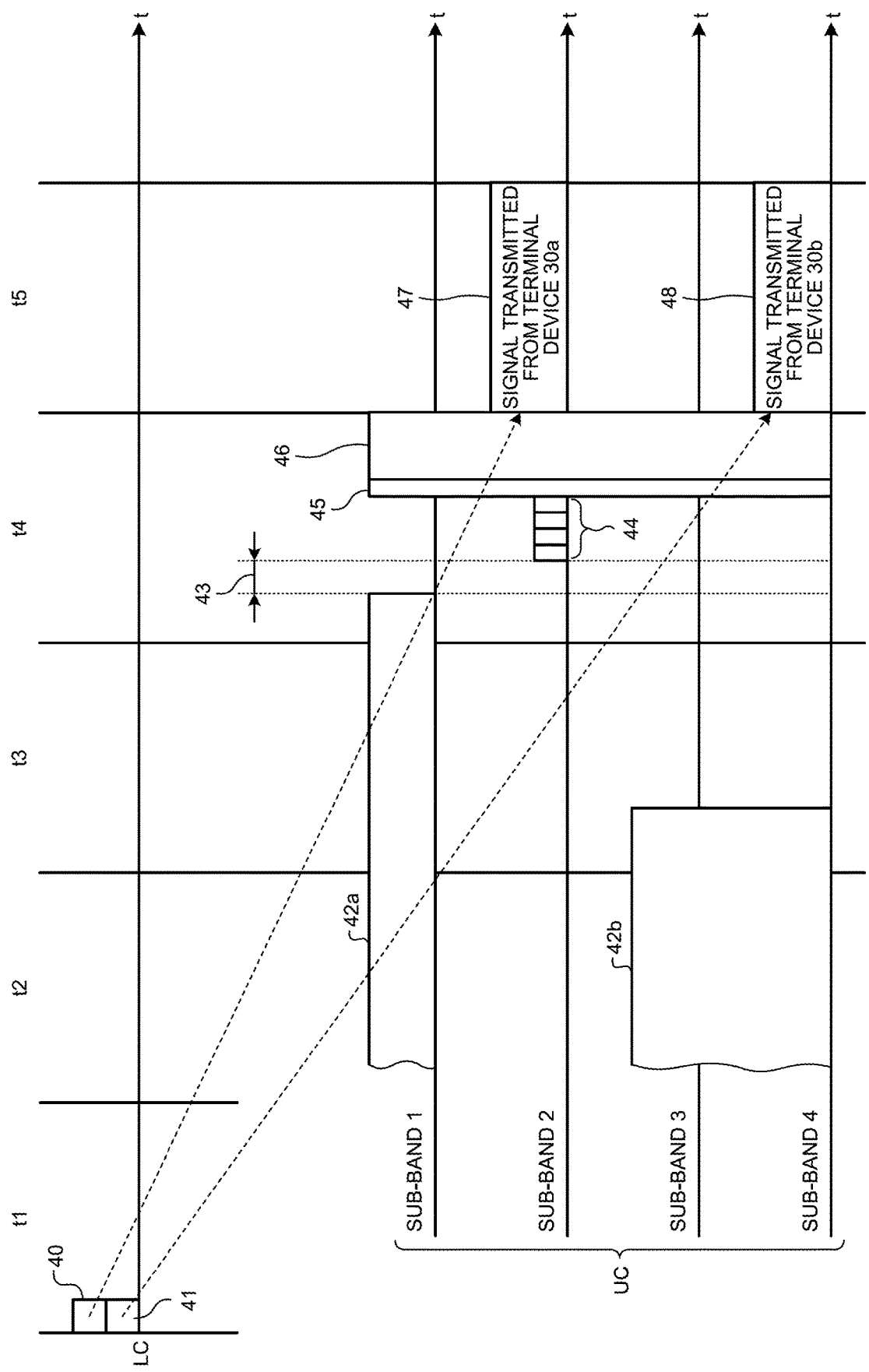
FIG. 4 is a diagram illustrating one example of an operation of a wireless communication system in the first embodiment.

Next, one example of an operation of transmitting data in the unlicensed band by the terminal device 30 in accordance with an instruction from the base station device 20 is explained, by using FIG. 4. FIG. 4 is a diagram illustrating one example of an operation of the wireless communication system 10 in the first embodiment. The wireless communication system 10 explained in FIG. 4 includes the base station device 20, the terminal device 30a, and the terminal device 30b. In FIG. 4, an upper part indicates a signal that is transmitted by using an LC, and a lower part indicates a signal that is transmitted by using a UC. Moreover, in FIG. 4, a horizontal axis indicates a flow of time, and t1 to t5 indicate respective periods (for example, 1 millisecond) in a subframe unit.

The unlicensed band is divided into multiple sub-bands as illustrated in FIG. 4. In the present embodiment, the unlicensed band is, for example, 20 MHz, and a band width of each of the sub-bands is, for example, 5 MHz. A signal 42a and a signal 42b indicated in each of the sub-bands in the unlicensed band are signals that are determined as busy in each of the sub-bands by the terminal device 30a. A signal that is determined as busy in each of the sub-bands by the terminal device 30b is not illustrated in FIG. 4.

First, the MAC control unit 202 of the base station device 20 generates a UL grant that includes information about a sub-band in the unlicensed band to be used for data transmission, a transmission start timing, a back-off value, and the like when a data transmission request to the terminal device 30 is issued. As the transmission start timing included in the UL grant, for example, a timing of four subframes later from the subframe at which the UL grant is transmitted from the base station device 20 is specified. The back-off value is a random value, but when UL grants are sent to the multiple terminal devices 30 in the same subframe period, the back-off values included in the respective UL grants are the same value.

In the example illustrated in FIG. 4, the MAC control unit 202 generates a UL grant 40 for the terminal device 30a, and generates a UL grant 41 for the terminal device 30b. Furthermore, in the example illustrated in FIG. 4, the MAC control unit 202 designates sub-band 2 as a sub-band of the unlicensed band to be used for data transmission for the terminal device 30a, and sub-band 4 for the terminal device 30b.

Receiving the UL grant 40 in the licensed band, the MAC processing unit 305 of the terminal device 30a instructs the determining unit 303 to determine whether the sub-band is idle for all of the sub-bands in the unlicensed band. The MAC processing unit 305 instructs the determining unit 303 to start determination whether the sub-band is idle from a predetermined time prior (for example, one frame prior) to the transmission start timing specified in the UL grant 41, for all of the sub-bands in the unlicensed band. The MAC processing unit 305 can instruct the determining unit 303 to start determination whether the sub-band is idle for all of the sub-bands in the unlicensed band when a UL grant is received.

In the example illustrated in FIG. 4, a signal 42a from another LTE system is being transmitted in sub-band 1, and a signal 42b from another LTE system is being transmitted in sub-bands 3 and 4. In the example illustrated in FIG. 4, the determining unit 303 of the terminal device 30a determines that all of the sub-bands in the unlicensed band are idle in a subframe period t4. When all of the sub-bands in the unlicensed band are determined as idle by the determining unit 303, the MAC processing unit 305 checks the idle state during a period of DIFS (Distributed coordination function Interframe Space) 43. When the continuous idle state is confirmed during the period of the DIFS 43, the MAC processing unit 305 checks continuation of the idle state during a period 44 that corresponds to the back-off value included in the UL grant.

When the continuous idle state is confirmed during the period 44 that corresponds to the back-off value, the MAC processing unit 305 instructs the unlicensed-band transmitting unit 330 to transmit a dummy signal in all of the sub-bands in the unlicensed band. Thus, for example, as illustrated in FIG. 4, a dummy signal 45 is transmitted in all of the sub-bands in the unlicensed band.

The dummy signal 45 can be any signal as long as it is a signal enabled to make other systems determine that all of the sub-bands in the unlicensed band are busy. Moreover, the dummy signal 45 can be a signal of a predetermined pattern that functions as a preamble of a CTS signal 46 that is transmitted following the dummy signal 45.

Subsequently, the MAC processing unit 305 instructs the unlicensed-band transmitting unit 330 to transmit the CTS signal 46 in all of the sub-bands in the unlicensed band. Thus, for example, as illustrated in FIG. 4, the CTS signal 46 is transmitted in all of the sub-bands in the unlicensed band. In a payload of the CTS signal 46, identification information of the cell to which the terminal device 30a belongs is stored.

The MAC processing unit 305 instructs the unlicensed-band transmitting unit 330 to transmit any kind of signal to all of the sub-bands in the unlicensed band during a period from when transmission of the CTS signal 46 is finished until the transmission start timing specified in the UL grant. Thus, it is possible to prevent the unlicensed band from being used by other systems during the period from when the transmission of the CTS signal 46 is finished until the transmission start timing specified in the UL grant. The signal transmitted to the unlicensed band in the period from when the transmission of the CTS signal 46 is finished until the transmission start timing specified in the UL grant can be the CTS signal 46 repeatedly used, or a dummy signal.

Subsequently, the terminal device 30a transmits a signal 47 of data at the transmission start timing specified in the UL grant 40. In the present embodiment, the respective terminal devices 30 transmits the signal 47 of data in the length identical to the subframe period from a boundary of a subframe, synchronizing the timing of the subframes, also in transmission of data using the sub-bands in the unlicensed band.

In the present embodiment, the respective terminal devices 30 transmit data through the sub-bands in the unlicensed band specified in the UL grant. Therefore, when a sub-band in the unlicensed band specified in the UL grant is idle, it seems that data can be transmitted by using the sub-band determined as idle.

However, the unlicensed band is used not only in the LTE system in which each of the terminal devices 30 is allocated to each sub-band, but also in a system such as a wireless LAN in which communication is performed by using the entire band in the unlicensed band. Therefore, in the wireless communication system 10 of the present embodiment, even when using a part of the sub-bands in the unlicensed band, data is transmitted using a part of the sub-bands after it is detected that all of the sub-bands in the unlicensed band are idle. Thus, fairness with other systems that use the entire band of the unlicensed band can be maintained.

On the other hand, the determining unit 303 of the terminal device 30b detects a signal that is transmitted in the unlicensed band also in the subframe period t4, and determines as busy, although it is not illustrated in FIG. 4. Therefore, the MAC processing unit 305 of the terminal device 30b does not instruct the unlicensed-band transmitting unit 330 to transmit the CTS signal.

The MAC processing unit 305 of the terminal device 30b receives, in the subframe period t4, the CTS signal 46 transmitted from the terminal device 30a to the unlicensed band. The MAC processing unit 305 determines whether identification information of the same cell as the cell to which the terminal device 30b belongs is included in the received CTS signal 46. When the identification information of the same cell as the cell to which the terminal device 30b belongs is included, the MAC processing unit 305 transmits a data signal 48 at the transmission start timing specified in the UL grant 41 even if the unlicensed band is busy.

However, for example, as illustrated in FIG. 1, the determining unit 303 can determine that the unlicensed band is busy because of a radio wave from the base station device 22 that belongs to a system different from the LTE system to which the terminal device 30b belongs. In that case, when the terminal device 30b performs transmission in the unlicensed band, it can affect reception operation of the base station device 22. Therefore, the MAC processing unit 305 calculates a transmission power by using, for example, the interference power that is measured by the measuring unit 302, the threshold that is used to determine whether the unlicensed band is busy (hereinafter, determination threshold), an initial value of the transmission power, and the minimum transmission power. The MAC processing unit 305 then outputs a control signal that indicates the calculated transmission power to the wireless processing unit 331 of the unlicensed-band transmitting unit 330. The wireless processing unit 331 transmits the signal 48 at the power that is indicated by the control signal output from the MAC processing unit 305.

For example, the MAC processing unit 305 calculates a transmission power that is larger out of a transmission power that is acquired by multiplying the initial value of the transmission power by a ratio between the interference power measured by the measuring unit 302 and the determination threshold, and the minimum transmission power. The MAC processing unit 305 then instructs the wireless processing unit 331 to transmit the signal 48 by the calculated transmission power.

Specifically, the MAC processing unit 305 calculates a transmission power P, for example, by using Equation (1) below.

[Eq. 1]

$$P = \max(P_0 - P_{measure} + P_{th}, P_{min}) \qquad (1)$$

where $P_0$ (dBm) is an initial value of a transmission power, $P_{measure}$ (dBm) is an interference power measured by the measuring unit 302, $P_{th}$ (dBm) is a threshold used to determine whether an unlicensed band is busy, and $P_{min}$ (dBm) is a minimum transmission power.

Assuming that transmission power of two devices included in the wireless communication system 10 are substantially the same, when each device transmits a radio wave, the intensity of the interference power that is received by one from the other is substantially the same as the intensity of the interference power that is received from one by the other. Moreover, when the transmission power of the other device is lowered to make the interference power that is measured at the one of the devices smaller than the determination threshold, it is possible to reduce the influence of a signal transmitted from the other one of the devices on the reception operation of one of the devices.

Therefore, in Equation (1) above, a difference (dB) between the interference power (dBm) that is measured by the measuring unit 302 and the determination threshold (dBm) is calculated first. Thereafter, out of the transmission power (dBm) that is calculated by subtracting the calculated difference (dB) from the initial value (dBm) of the transmission power, and the minimum transmission power (dBm), a larger power is calculated as the transmission power P.

For example, when the interference power measured by the measuring unit 302 is −52 dBm, and the determination threshold is −62 dBm, the difference between the interference power and the threshold is 10 dB. Therefore, by transmitting with a power smaller than the initial value of the transmission power by 10 dB, a signal transmitted from the terminal device 30b is to be received at a device causing the interference at −62 dBm or smaller. Thus, the terminal device 30b can reduce the influence on reception operation of a device causing the interference when transmitting the signal 48 to the sub-band in the unlicensed band specified in the UL grant 41.

When the interference power measured at the terminal device 30b is large, the power of transmission by the terminal device 30b is calculated low. When the transmission power is too low, a signal transmitted from the terminal device 30b is not delivered to the base station device 20 with a sufficient intensity. Therefore, when the transmission power that is calculated by using the interference power and the determination threshold is smaller than the minimum transmission power, transmission is performed at the minimum transmission power. The minimum transmission power is the smallest transmission power that enables the base station device 20 to receive a signal from the terminal device 30 when the terminal device 30 belonging to a cell transmits data at the boundary of the cell. Information of the minimum transmission power is, for example, included in a UL grant transmitted from the base station device 20. Thus, the terminal device 30b enables the base station device 20 to receive transmitted data.

[Operation of Base Station Device 20]

Figure 5:
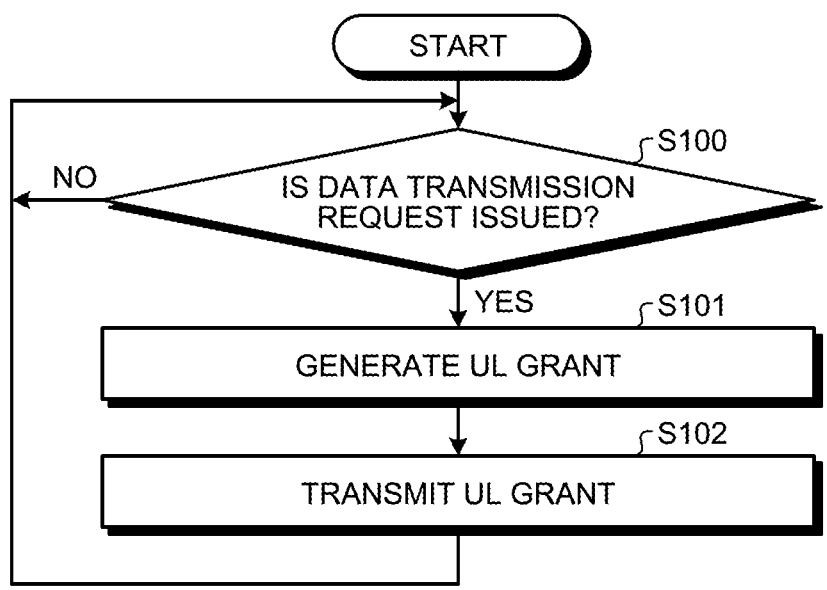
FIG. 5 is a flowchart of one example of an operation of the base station device in the first embodiment.

Next, an operation of the base station device 20 is explained. FIG. 5 is a flowchart of one example of the operation of the base station device in the first embodiment.

First, the MAC control unit 202 of the base station device 20 determines whether a data transmission request to the terminal device 30 is issued (S100). When a data transmission request to the terminal device 30 is issued (S100: YES), the MAC control unit 202 generates a UL grant (step S101). The MAC control unit 202 then outputs the generated UL grant to the multiplexer unit 223 of the licensed-band transmitting unit 220.

The multiplexer unit 223 multiplexes the UL grant output from the MAC control unit 202 and a signal output from the modulating unit 222. The IFFT processing unit 224 performs IFFT processing on the transmission signal multiplexed by the multiplexer unit 223. The wireless processing unit 225 performs wireless processing on the transmission signal subjected to the IFFT processing by the IFFT processing unit 224. The wireless processing unit 225 then transmits the transmission signal including the UL grant through the antenna 226 (S102). Subsequently, the MAC control unit 202 performs the processing indicated at step S100 again.

[Operation of Terminal Device 30]

Figure 6:
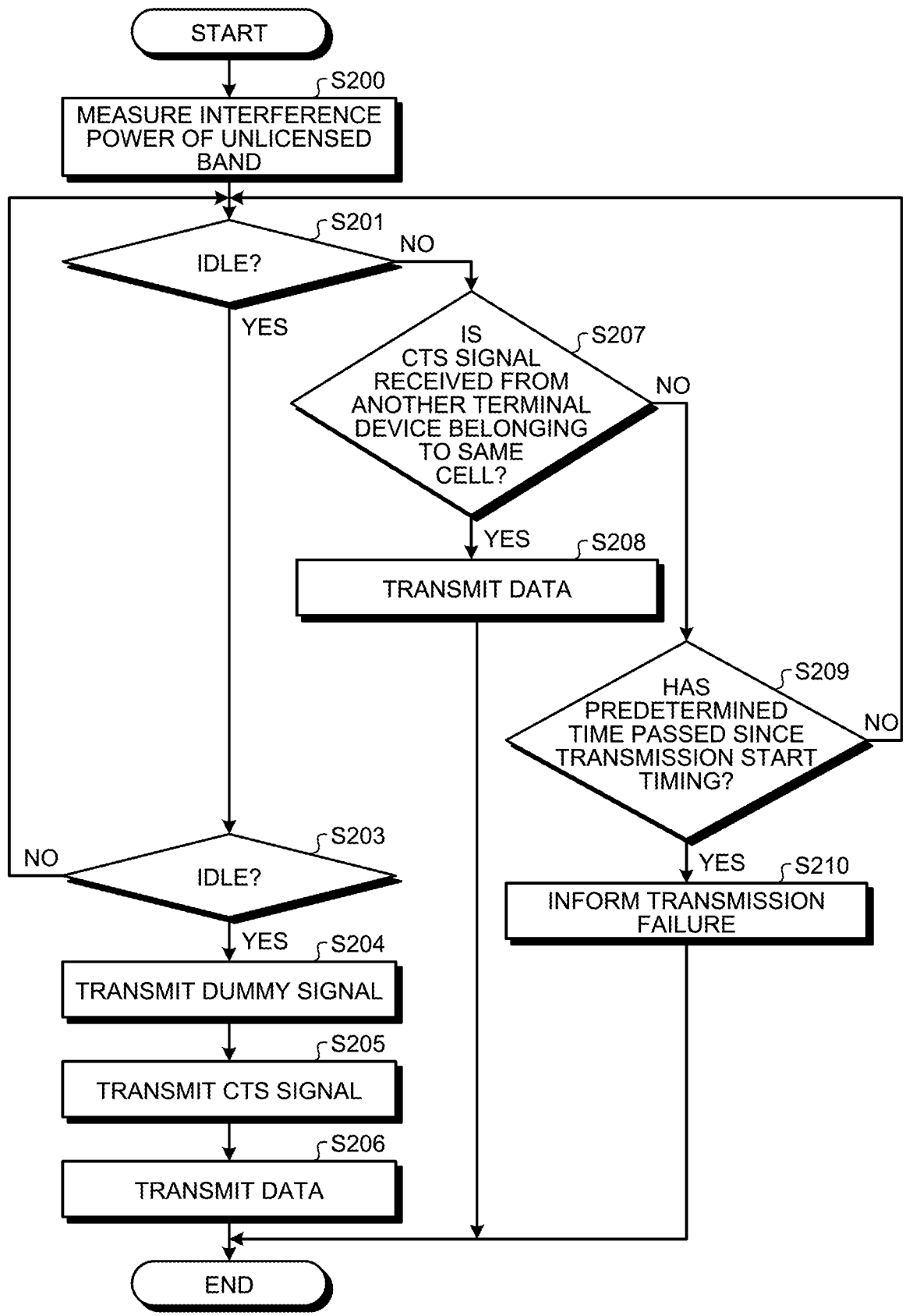
FIG. 6 is a flowchart of one example of an operation of the terminal device in the first embodiment.

Next, an operation of the terminal device 30 is explained. FIG. 6 is a flowchart of one example of an operation of the terminal device 30 in the first embodiment. When the MAC processing unit 305 of the terminal device 30 receives a UL grant, the terminal device 30 starts the operation indicated in the flowchart.

First, the measuring unit 302 measures an interference power of an unlicensed band based on a reception signal output from the wireless processing unit 321 (S200). The MAC processing unit 305 then instructs the determining unit 303 to determine whether the unlicensed band is idle. The MAC processing unit 305 refers to the determination result output from the determining unit 303 to determine whether the unlicensed band is idle (S201).

When the unlicensed band is idle (S201: YES), the MAC processing unit 305 further determines whether the idle state has continued during a period corresponding to the DIFS and the back-off value, that is, whether the unlicensed band has been idle (S203). When the unlicensed band is busy (S203: NO), the MAC processing unit 305 performs the processing indicated at step S201 again.

In the other hand, when the unlicensed band is idle (S203: YES), the MAC processing unit 305 instructs the unlicensed-band transmitting unit 330 to transmit a dummy signal. The unlicensed-band transmitting unit 330 transmits the dummy signal to entire bands in the unlicensed band (S204). The MAC processing unit 305 then generates a CTS signal including identification information of the cell to which the terminal device 30 belongs in a payload. Furthermore, the MAC processing unit 305 instructs the unlicensed-band transmitting unit 330 to transmit the generated CTS signal. The unlicensed-band transmitting unit 330 transmits the CTS signal to the entire bands in the unlicensed band (S205). The MAC processing unit 305 keeps transmitting a signal to the entire bands in the unlicensed band throughout a period until a transmission start timing specified in the UL grant, by causing the unlicensed-band transmitting unit 330 to transmit the CTS signal repeatedly, or the like.

Subsequently, the MAC processing unit 305 instructs the encoding/modulating unit 306 to transmit data at the transmission start timing specified in the UL grant. Specifically, the MAC processing unit 305 instructs the encoding/modulating unit 306 to subject a packet output from the packet generating unit 307 to processing of encoding and modulating. The transmission signal encoded and modulated by the encoding/modulating unit 306 is transmitted to the base station device 20 through a sub-band in the unlicensed band specified in the UL grant, by the unlicensed-band transmitting unit 330 (S206).

On the other hand, when the unlicensed band is busy (S201: NO), the MAC processing unit 305 refers to a signal received from the RRC processing unit 304 to determine whether the CTS signal has been received from the other terminal device 30 belonging to the same cell (S207). The MAC processing unit 305 determines that the CTS signal is received from the other terminal device 30 belonging to the same cell when identification information identical to the identification information of the cell to which the terminal device 30 belongs is included in the payload of the CTS signal.

When the CTS signal is received from the other terminal device 30 belonging to the same cell is received (S207: YES), the MAC processing unit 305 instructs the encoding/modulating unit 306 to transmit data. Thus, the packet output from the packet generating unit 307 is encoded and modulated by the encoding/modulating unit 306. Subsequently, the modulated signal is transmitted to the base station device 20 through a sub-band in the unlicensed band specified in the UL grant, by the unlicensed-band transmitting unit 330 (S208).

On the other hand, when the CTS signal is not received from the other terminal device 30 belonging to the same cell (S207: NO), the MAC processing unit 305 determines whether a predetermined time has passed since the transmission start timing specified in the UL grant (S209). When the predetermined time has not passed since the transmission start timing specified in the UL grant (S209: NO), the MAC processing unit 305 performs the processing indicated at step S201 again.

On the other hand, when the predetermined time has passed since the transmission start timing specified in the UL grant (S209: YES), the MAC processing unit 305 sends a signal informing transmission failure to the licensed-band transmitting unit 340. The licensed-band transmitting unit 340 transmits the signal informing the transmission failure to the base station device 20 through the licensed band (S210). The MAC processing unit 305 transmits the signal informing transmission failure to the base station device 20 when, for example, a period corresponding to three sub-frames has passed since the transmission start timing.

[Effect]

According to the wireless communication system 10 of the present embodiment, the terminal device 30 that has received a CTS signal from the other terminal device 30 belonging to the same cell starts transmission of data to an unlicensed band even when the unlicensed band has been determined as busy by the LBT. Thus, reduction of the throughput of data in uplink of the terminal device 30 can be eased.

Moreover, the terminal device 30 that has determined that the unlicensed band is idle transmits data in a sub-band that is specified in a UL grant after transmitting a CTS signal that includes identification information of the cell to which the terminal device 30 belongs to the unlicensed band. The other terminal devices 30 can determine whether it is the CTS signal transmitted from the terminal device 30 belonging to the same cell, by receiving the CTS signal.

Furthermore, the terminal device that has received a CTS signal from another unit of the terminal devices 30 belonging to the same cell performs transmission with a transmission power that is the larger one out of a transmission power acquired by multiplying the initial value of the transmission power by a ratio between the interference power and the determination threshold, and a minimum transmission power. Thus, an influence on reception operation of the other devices can be reduced.

Moreover, in the present embodiment, the back-off value included in a UL grant is in identical value among the terminal devices 30. Thus, when continuation of the idle state during a period corresponding to DIFS and the back-off value is detected after the multiple terminal devices 30 detect that the unlicensed band is idle at the same time, the terminal devices 30 transmit a dummy signal and the CTS signal at substantially the same time to the unlicensed band. In the present embodiment, the CTS signal transmitted from each of the terminal devices 30 is the same signal. Therefore, even when the CTS signals transmitted from multiple terminal devices 30 are overlapped, the signals are received by the other terminal devices 30 without deformation. Furthermore, by transmitting the CTS signal by the multiple terminal devices 30, it is possible to deliver the CTS signal to a wider range in the cell. Thus, a transmission opportunity can be given to more units of the terminal devices 30 that have determined that the unlicensed band is busy.

Second Embodiment

[Operation of Wireless Communication System 10]

Figure 7:
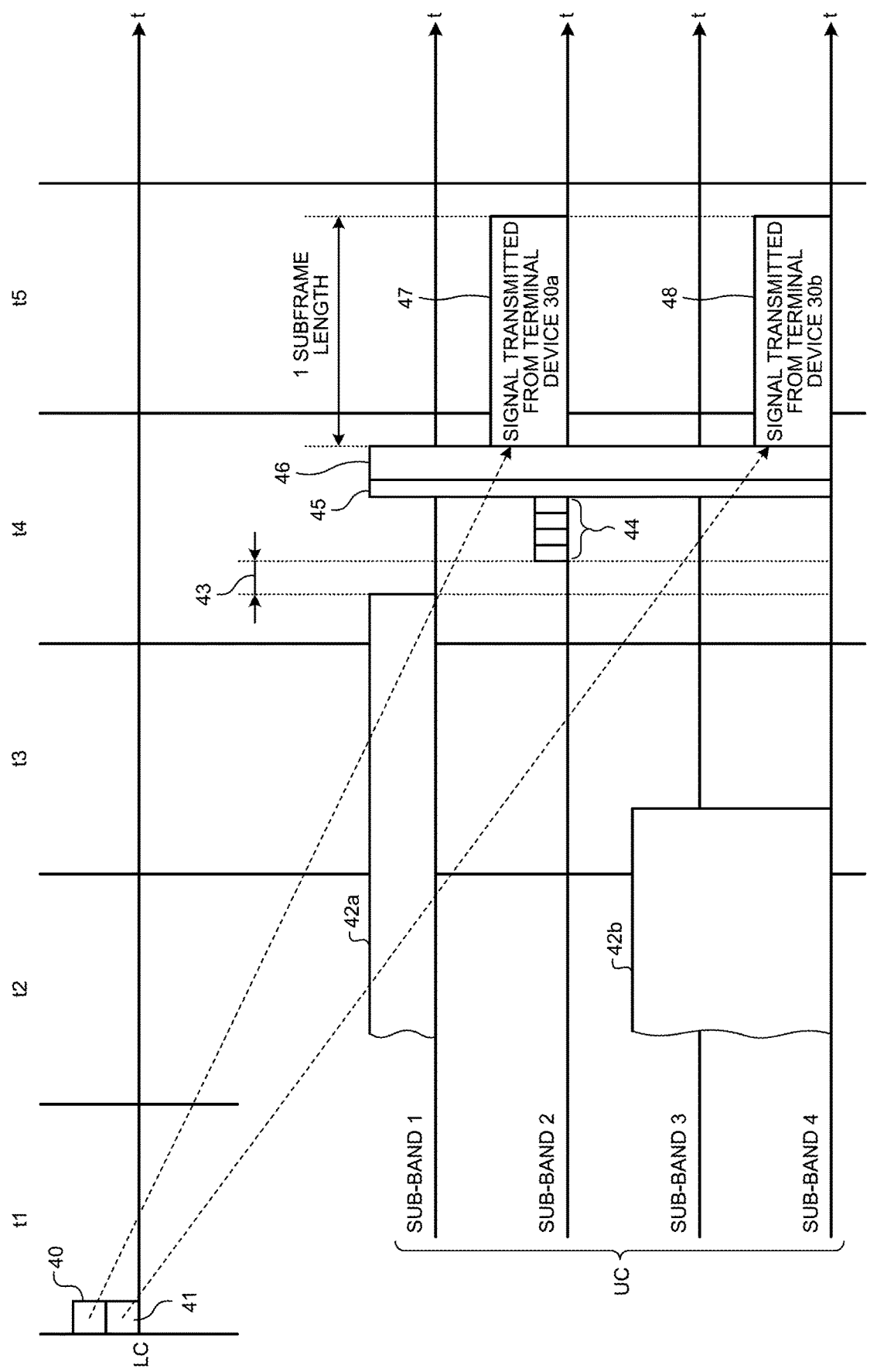
FIG. 7 is a diagram illustrating one example of an operation of a wireless communication system in a second embodiment.

While the terminal device 30 in the first embodiment described above transmits data at timing synchronized with a timing of a subframe, the terminal device 30 of the present embodiment differs from the terminal device 30 of the first embodiment in a point that it transmits data without reference to a timing of a subframe. In the following, the different point from the first embodiment is explained referring to FIG. 7. FIG. 7 is a diagram illustrating one example of an operation of the wireless communication system 10 in a second embodiment.

The configurations of the wireless communication system 10, the base station device 20, and the terminal device 30 are the same as those of the wireless communication system 10, the base station device 20, and the terminal device 30 explained in the first embodiment except points explained below, and therefore, detailed explanation thereof is omitted. Moreover, in FIG. 7, components with identical reference symbols to those in FIG. 4 are similar to the components explained in FIG. 4, and therefore, detailed explanation thereof is omitted.

For example, as illustrated in FIG. 7, when all of the sub-bands in the unlicensed band are determined as idle by the determining unit 303 in the subframe period t4, the MAC processing unit 305 of the terminal device 30a confirms continuation of the idle state during a period of the DIFS 43. When the continuation of the idle state during the period of the DIFS 43 is confirmed, the MAC processing unit 305 confirms the continuation of the idle state during the period 44 corresponding to the back-off value that is included in the UL grant.

When the continuation of the idle state has been confirmed during the period 44 corresponding to the back-off value, the MAC processing unit 305 causes the unlicensed-band transmitting unit 330 to transmit the dummy signal 45 in all of the sub-band in the unlicensed band.

Subsequently, the MAC processing unit 305 causes the unlicensed-band transmitting unit 330 to transmit the CTS signal 46 in all of the sub-bands in the unlicensed band. In the present embodiment, even when a timing at which the transmission of the CTS signal 46 is finished is a timing earlier than a subframe that is specified in the UL grant, the MAC processing unit 305 starts transmission of data in the sub-band specified in the UL grant.

Furthermore, when receiving the CTS signal from the other terminal devices 30 belonging to the same cell, the MAC processing unit 305 of the terminal device 30b that has determined that the unlicensed band is busy starts transmission of data at the timing when transmission of the CTS signal is finished.

As described, in the present embodiment, when any one of the terminal devices 30 that have detected that the unlicensed band is idle transmits the CTS signal, each of the terminal devices 30 starts data transmission at the timing when transmission of the CTS signal is finished. Thus, the throughput of data transmitted to the base station device 20 from each of the terminal devices 30 can be improved. Moreover, as data transmission using the unlicensed band can be completed early, a time of needless occupancy of the unlicensed band can be reduced, and the use efficiency of the unlicensed band can be enhanced.

In the present embodiment, the length of a signal transmitted to the unlicensed band from each of the terminal devices 30 is one subframe length. This enables to use conventional transmission buffer and reception buffer with which data is communicated in a subframe unit, and a manufacturing cost of the terminal device 30 can be reduced.

Third Embodiment

[Operation of Wireless Communication System 10]

Figure 8:
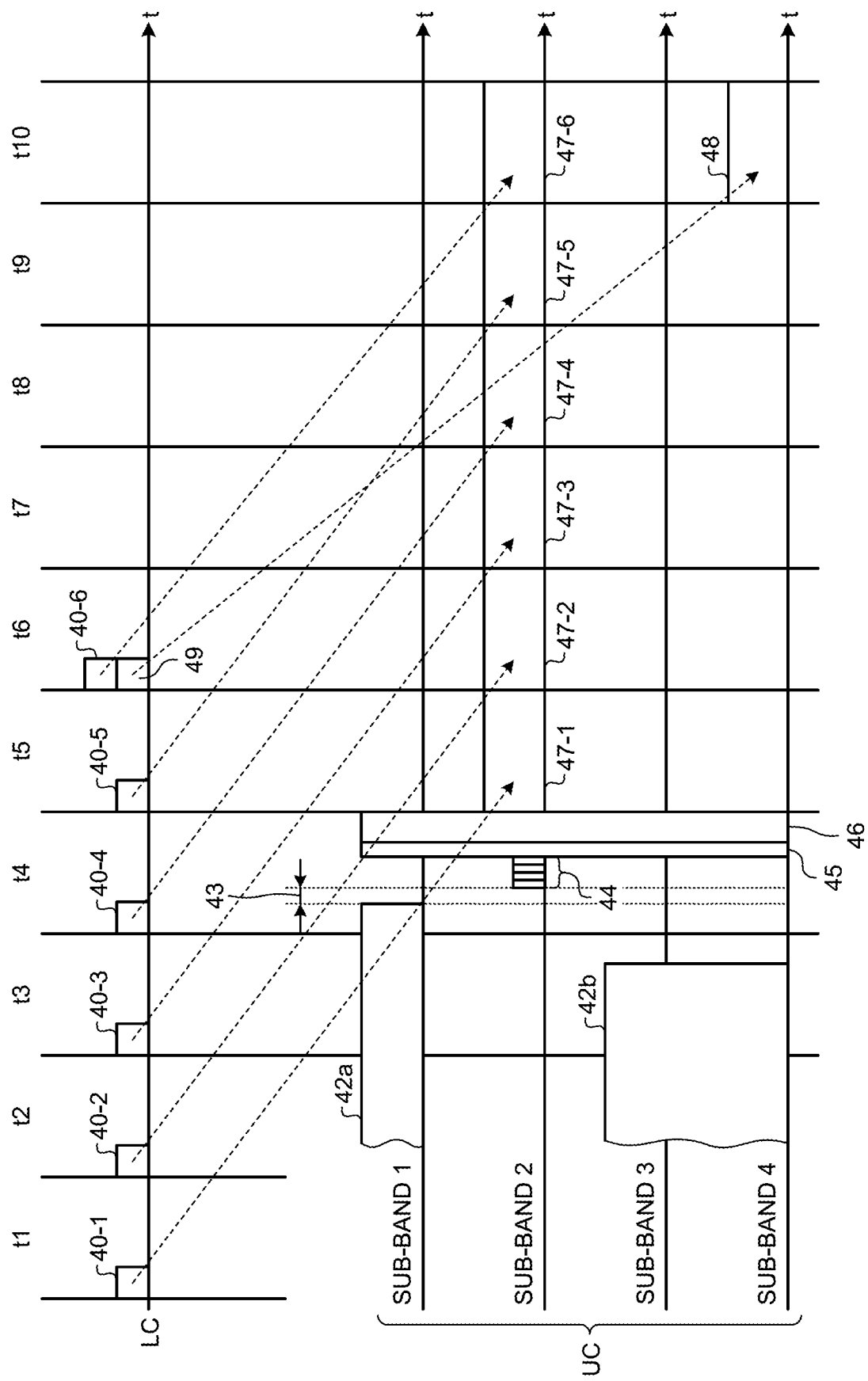
FIG. 8 is a diagram illustrating one example of an operation of a wireless communication system in a third embodiment.
Figure 9:
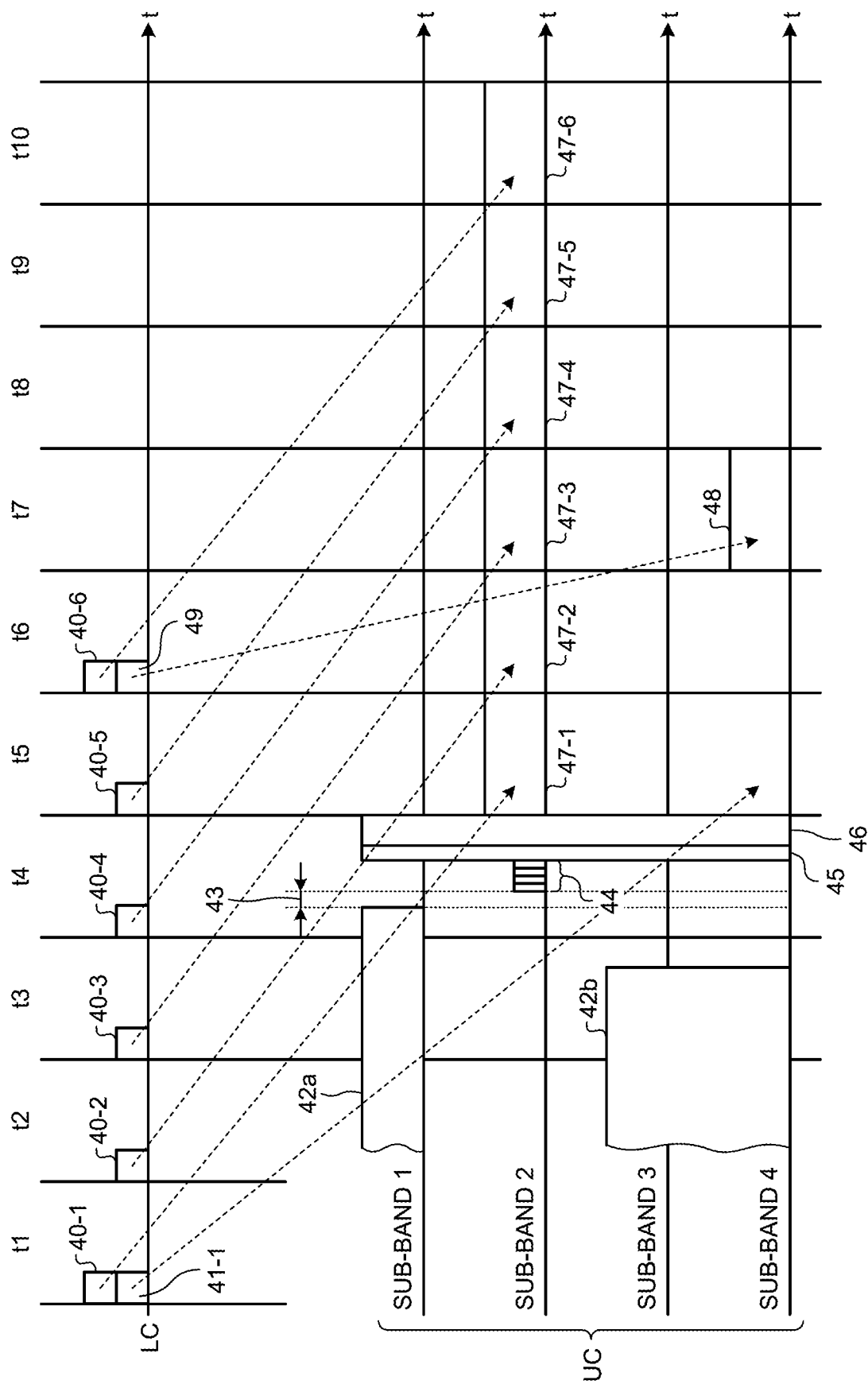
FIG. 9 is a diagram illustrating one example of an operation of the wireless communication system in the third embodiment.

FIG. 8 and FIG. 9 are diagrams illustrating one example of an operation of the wireless communication system 10 in a third embodiment. The configurations of the wireless communication system 10, the base station device 20, and the terminal device 30 in the third embodiment are the same as those of the wireless communication system 10, the base station device 20, and the terminal device 30 explained in the first embodiment except points explained below, and therefore, detailed explanation thereof is omitted.

For example, as illustrated in FIG. 8, when a data transmission request to the terminal device 30a is issued, the MAC control unit 202 of the base station device 20 generates a first UL grant 40-1 for the terminal device 30a. The first UL grant 40-1 has the same contents as the UL grant 40 explained in the first embodiment. The MAC control unit 202 then outputs the generated first UL grant 40-1 to the multiplexer unit 223.

The multiplexer unit 223 multiplexes the first UL grant 40-1 output from the MAC control unit 202 and a signal output from the modulating unit 222. The IFFT processing unit 224 performs IFFT processing on the transmission signal multiplexed by the multiplexer unit 223. The wireless processing unit 225 performs wireless processing on the transmission signal subjected to the IFFT processing by the IFFT processing unit 224. The wireless processing unit 225 then transmits the transmission signal including the first UL grant 40-1 through the antenna 226 in the subframe period t1.

The licensed-band receiving unit 310 of the terminal device 30a receives and modulates the transmission signal including the first UL grant 40-1 transmitted in the licensed band. The decoding unit 301 decodes control information including the first UL grant 40-1 from the reception signal output from the licensed-band receiving unit 310. The RRC processing unit 304 outputs the control information decoded by the decoding unit 301 to the MAC processing unit 305.

When the control information received from the RRC processing unit 304 includes the first UL grant 40-1, the MAC processing unit 305 instructs the determining unit 303 to perform carrier sense of the unlicensed band based on a measurement result output from the measuring unit 302. The MAC processing unit 305 performs the LBT referring to the determination result output from the determining unit 303. In the example in FIG. 8, the MAC processing unit 305 detects that the unlicensed band is idle in the subframe period t4, and confirms the continuation of the idle state during the period 44 corresponding to the DIFS 43 and the back-off value. When the continuation of the idle state in the period 44 corresponding to the back-off value is confirmed, the MAC processing unit 305 instructs the unlicensed-band transmitting unit 330 to transmit the dummy signal 45. Subsequently, the MAC processing unit 305 instructs the unlicensed-band transmitting unit 330 to transmit the CTS signal 46.

Subsequently, the MAC processing unit 305 causes the unlicensed-band transmitting unit 330 to transmit a signal 47-1 of data in the sub-band in the unlicensed band specified in the first UL grant 40-1 in the subframe period t5, which is after the transmission of the CTS signal 46. Thus, the unlicensed-band receiving unit 230 of the base station device 20 receives the signal 47-1 transmitted from the terminal device 30a in the subframe period t5. The unlicensed-band receiving unit 230 decodes the received signal 47-1.

Thereafter, similarly, First UL grants 40-2 to 40-6 are transmitted from the base station device 20 to the terminal device 30a in the licensed band. The terminal device 30a transmits signals 47-2 to 47-6 of data to the sub-band in the unlicensed band in subframe periods t6 to t10, respectively.

Thus, the base station device 20 receives the signals 47-2 to 47-6 transmitted from the terminal device 30a in the subframe periods t6 to t10.

When a data transmission request to the terminal device 30a is issued in the subframe period t6 in which the data is being received from the terminal device 30a in the unlicensed band, the MAC control unit 202 of the base station device 20 generates a second UL grant 49. The second UL grant includes a transmission instruction indicating that transmission is started without performing the LBT. The MAC control unit 202 causes the licensed-band transmitting unit 220 to transmit a transmission signal including the generated second UL grant 49, similarly to the first UL grants 40-1 to 40-6.

The licensed-band receiving unit 310 of the terminal device 30b receives and demodulates the transmission signal that includes the second UL grant 49 transmitted in the licensed band. The decoding unit 301 decodes control information including the second UL grant 49 from the reception signal output from the licensed-band receiving unit 310. The RRC processing unit 304 outputs the control information decoded by the decoding unit 301 to the MAC processing unit 305.

When the second UL grant 49 is included in the control information received from the RRC processing unit 304, the MAC processing unit 305 omits the LBT by not instructing the determining unit 303 to perform the carrier sense of the unlicensed band. The MAC processing unit 305 then transmits the data signal 48 to the unlicensed-band transmitting unit 330 in the subframe period t10 that is the transmission start timing specified in the second UL grant 49.

When the base station device 20 is receiving data from the terminal device 30a in the unlicensed band, the LTE system to which the base station device 20 belongs has already acquired a transmission right in the unlicensed band. Therefore, during data reception from the subordinate terminal device 30a in the unlicensed band, sub-bands other than the sub-band allocated to the terminal device 30a are idle. Therefore, when a UL grant is transmitted to the terminal device 30b, which is another subordinate unit during the data reception from the subordinate terminal device 30a in the unlicensed band, it is not necessary for the other terminal device 30b to perform the LBT. Therefore, in such a case, by transmitting the second UL grant to the terminal device 30 from the base station device 20, a transmission opportunity for the terminal device 30 can be obtained. Moreover, omission of the LBT reduces a processing load of the terminal device 30.

Moreover, in the example illustrated in FIG. 9, when a data transmission request to the terminal devices 30a and 30b is issued, the MAC control unit 202 of the base station device 20 generates the first UL grant 40-1 to the terminal device 30a and a first UL grant 41-1 to the terminal device 30b. The first UL grants 40-1 and 41-1 generated by the MAC control unit 202 are multiplexed with a signal output from the modulating unit 222 by the multiplexer unit 223. The multiplexed signals are subjected to the IFFT processing by the IFFT processing unit 224 and to the wireless processing by the wireless processing unit 225, and transmitted in the subframe period t1.

The MAC processing unit 305 of the terminal device 30a performs the LBT, and detects that the unlicensed band is idle in the subframe period t4, and confirms the continuation of the idle state during the period 44 corresponding to the DIFS 43 and the back-off value. When the continuation of the idle state during the period 44 corresponding to the back-off value is confirmed, the MAC processing unit 305 instructs the unlicensed-band transmitting unit 330 to transmit the dummy signal 45. The MAC processing unit 305 instructs the unlicensed-band transmitting unit 330 to transmit the CTS signal 46.

Subsequently, the MAC processing unit 305 causes the unlicensed-band transmitting unit to transmit the signal 47-1 of data in the sub-band in the unlicensed band specified in the first UL grant 40-1 in the subframe period t5 after the transmission of the CTS signal 46. Thus, the unlicensed-band receiving unit 230 of the base station device 20 receives the signal 47-1 transmitted from the terminal device 30a in the subframe period t5. The unlicensed-band receiving unit 230 then decodes the received signal 47-1.

Thereafter, similarly, first UL grants 40-2 to 40-6 are transmitted to the terminal device 30a from the base station device 20 in the licensed band. The terminal device 30a transmits the signals 47-2 to 47-6 of data in the sub-band of the unlicensed band in the subframe periods t6 to t10, respectively. Thus, the base station device 20 receives the signals 47-2 to 47-6 transmitted from the terminal device 30a in the subframe periods t6 to t10.

On the other hand, in the unlicensed band, the terminal device 30b detects an interference power from another system, and determines that the unlicensed band is busy. Furthermore, in the example in FIG. 9, the terminal device 30b assumes that reception of the CTS signal transmitted from the terminal device 30a in the unlicensed band has failed. In this case, the terminal device 30b regards also the signals 47-1 to 47-6 transmitted from the terminal device 30a to the unlicensed band as the interference power, and keeps determining that the unlicensed band is busy. As a result, the terminal device 30b suspends transmission of data.

The MAC control unit 202 of the base station device 20 receives data transmitted from the terminal device 30a in the subframe period t5 in response to the first UL grant 40-1 that is transmitted to the terminal device 30a in the subframe period t1. On the other hand, the MAC control unit 202 detects that data is not received in the subframe period t5 in response to the first UL grant 41-1 that is transmitted to the terminal device 30b in the subframe period t1. In this case, the MAC control unit 202 generates the second UL grant 49 that includes the transmission instruction indicating that transmission is started without performing the LBT. The MAC control unit 202 then outputs a signal including the generated second UL grant 49 to the licensed-band transmitting unit 220, to cause it to transmit to the terminal device 30b in the next subframe period t6. Thus, in the subframe period t6, the second UL grant 49 is transmitted to the terminal device 30b.

The licensed-band receiving unit 310 of the terminal device 30b receives and demodulates the transmission signal including the second UL grant 49 transmitted in the licensed band. The decoding unit 301 decodes control information that includes the second UL grant 49 from the reception signal output from the licensed-band receiving unit 310. The RRC processing unit 304 outputs the control signal decoded by the decoding unit 301 to the MAC processing unit 305.

When the second UL grant 49 is included in the control information received from the RRC processing unit 304, the MAC processing unit 305 omits the LBT by not instructing the determining unit 303 to perform the carrier sense of the unlicensed band. The MAC processing unit 305 then causes the unlicensed-band transmitting unit 330 to transmit the data signal 48 in the subframe period t7 following the subframe period t6 in which the second UL grant 49 is received.

Thus, a transmission opportunity for the terminal device 30 that has failed to receive the CTS signal transmitted from the other terminal device 30 belonging to the same cell can be obtained. Thus, reduction of the throughput in uplink of the terminal device 30 that has failed to receive the CTS signal can be eased.

[Operation of Base Station Device 20]

Figure 10:
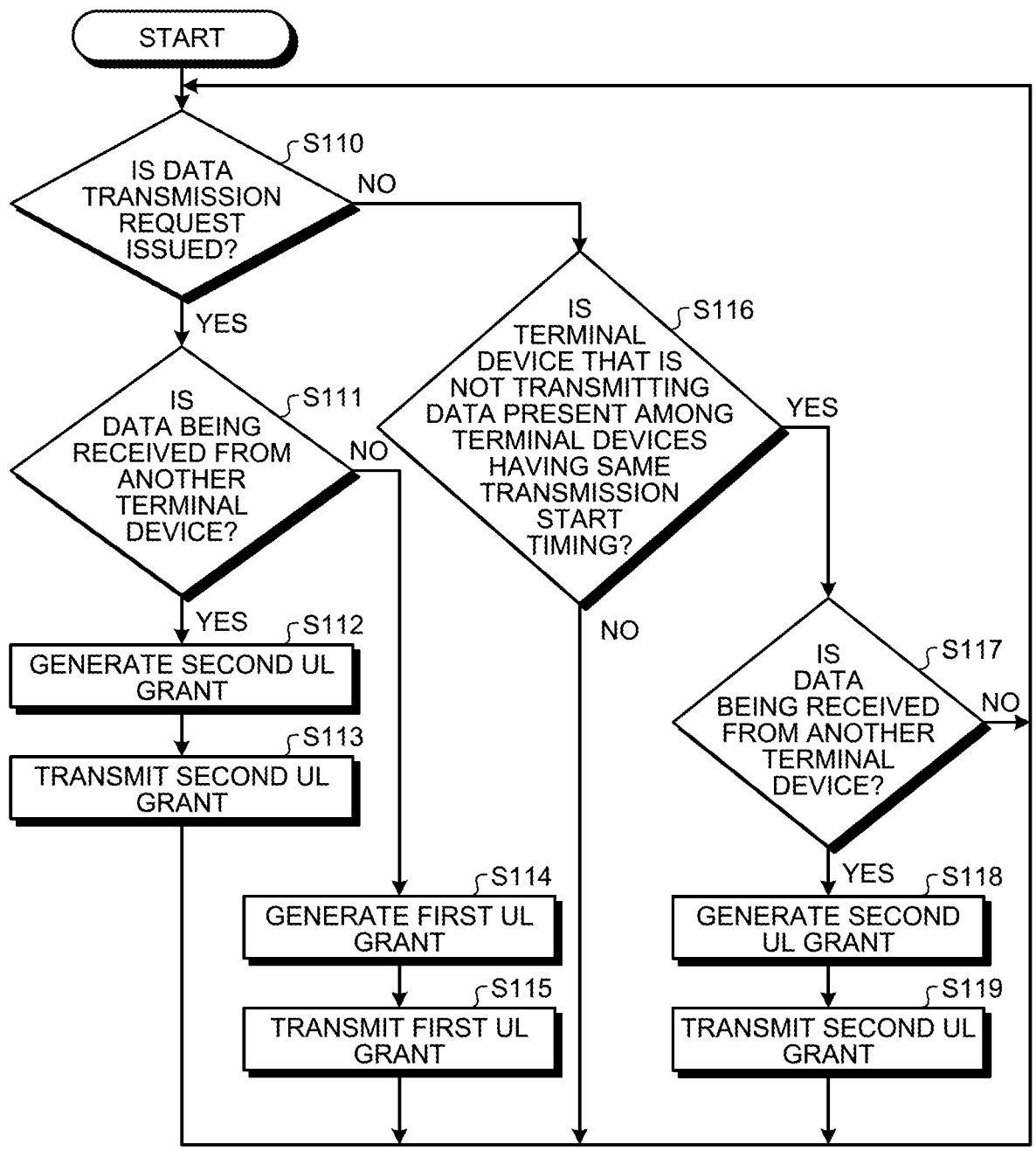
FIG. 10 is a flowchart of one example of an operation of a base station device in the third embodiment.

Next, an operation of the base station device 20 is explained. FIG. 10 is a flowchart of one example of an operation of the base station device 20 in the third embodiment.

First, the MAC control unit 202 of the base station device 20 determines whether a data transmission request to the terminal device 30 has been issued (S110). When a data transmission request to the terminal device 30 has been issued (S110) YES, the MAC control unit 202 determines whether data transmitted from the other terminal device 30 is being received (S111).

When data transmitted from the other terminal device 30 is being received (S111: YES), the MAC control unit 202 generates the second UL grant including an instruction to start transmission without performing the LBT (S112). The MAC control unit 202 causes the licensed-band transmitting unit 220 to transmit the generated second UL grant (S113). The MAC control unit 202 then performs the processing indicated at step S110 again.

On the other hand, when data transmitted from the other terminal device 30 is not being received (S111: NO), the MAC control unit 202 generates the first UL grant not including the instruction to start transmission without performing the LBT (S114). The MAC control unit 202 causes the licensed-band transmitting unit 220 to transmit the generated first UL grant (S115). The MAC control unit 202 then performs the processing indicated at step S110 again.

When a data transmission request has not been issued (S110: NO), the MAC control unit 202 determines whether there is the terminal device 30 that is not transmitting data among the terminal devices 30, the transmission start timings specified in the first UL grant of which are the same (S116). When there is no terminal device 30 that is not transmitting data among the terminal devices 30 having the same transmission start timing (S116: NO), the MAC control unit 202 performs the processing indicated at step S110 again.

When there is the terminal device 30 that is not transmitting data among the terminal devices 30 having the same transmission start timing (S116: YES), the MAC control unit 202 determines whether data transmitted from the other terminal device 30 is being received (S117). When data transmitted from the other terminal device 30 is not being received (S117: NO), the MAC control unit 202 performs the processing indicated at step S110 again.

On the other hand, when data transmitted from the other terminal device 30 is being received (S117: YES), The MAC control unit 202 generates the second UL grant (S118). The MAC control unit 202 causes the licensed-band transmitting unit 220 to transmit the generated second UL grant (S119). The MAC control unit 202 then performs the processing indicated at step S110 again.

[Operation of Terminal Device 30]

Figure 11:
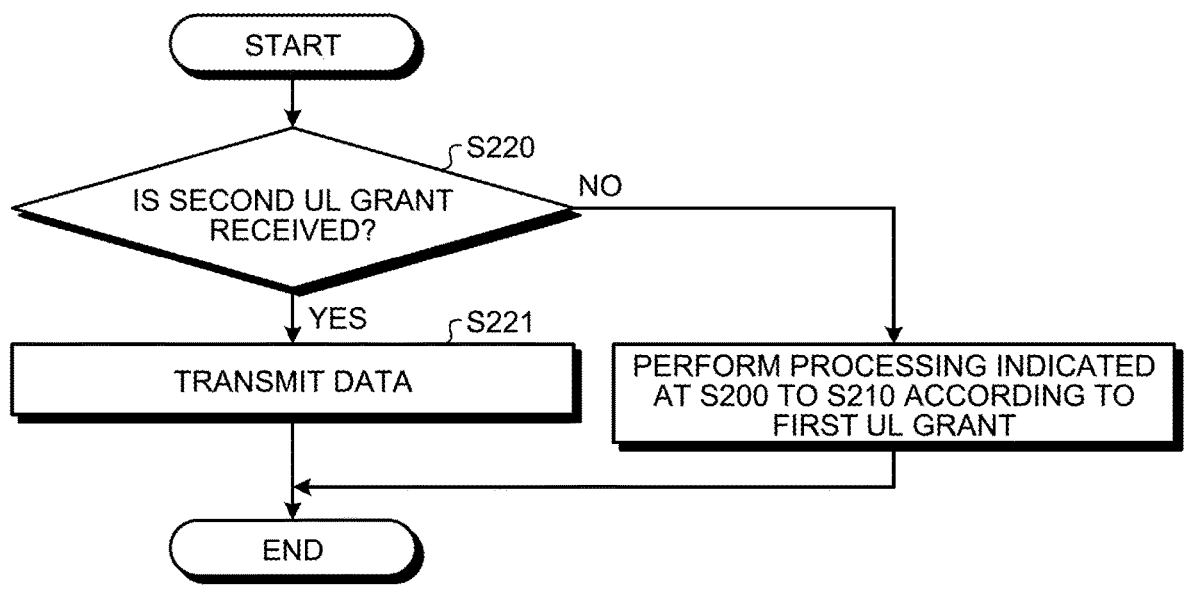
FIG. 11 is a flowchart of one example of an operation of a terminal device in the third embodiment.

Next, an operation of the terminal device 30 is explained. FIG. 11 is a flowchart of one example of an operation of the terminal device 30 in the third embodiment. When the MAC processing unit 305 of the terminal device 30 receives the first or the second UL grant, the terminal device 30 starts the operation indicated in this flowchart.

First, the MAC processing unit 305 determines whether a received UL grant is the second UL grant (S220). When the UL grant is the second UL grant (S220: YES), the MAC processing unit 305 causes the unlicensed-band transmitting unit 330 to transmit a data signal at a transmission start timing specified in the second UL grant (S221).

On the other hand, when the received UL grant is the first UL grant (S220: NO), the MAC processing unit 305 performs the processing at steps S200 to S210 explained using FIG. 6, in accordance with the first UL grant.

Fourth Embodiment

In the wireless communication system 10 in the first embodiment described above, the terminal device 30 determines whether an unlicensed band is idle, and started data transmission after transmitting the CTS signal to the unlicensed band when determining as idle. On the other hand, in the wireless communication system 10 of the present embodiment, the base station device 20 performs the carrier sense of an unlicensed band, and transmits a predetermined signal indicating data transmission permission when determining as idle. In the present embodiment, the predetermined signal is, for example, an RTS (Request To Send) signal including identification information of the base station device 20. When detecting the RTS signal, the terminal device 30 that has received the UL grant transmits data to a sub-band specified in the UL grant without performing the LBT when the identification information of the cell to which the own device belongs is included in the detected RTS signal.

[Base Station Device 20]

Figure 12:
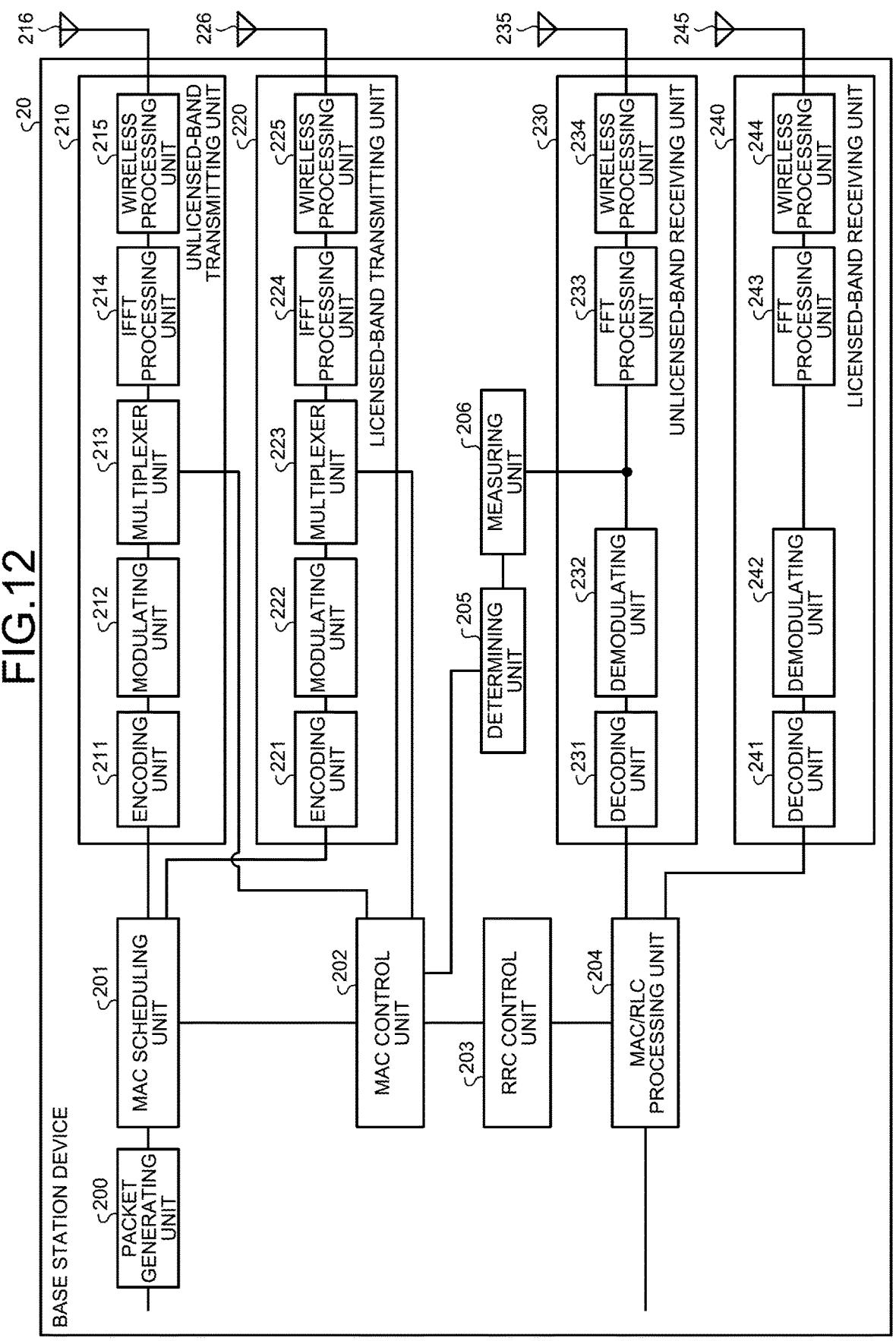
FIG. 12 is a block diagram illustrating one example of a base station device in a fourth embodiment.

FIG. 12 is a block diagram illustrating one example of the base station device 20 in a fourth embodiment. In FIG. 12, components with identical reference symbols to those in FIG. 2 are similar to the components explained in FIG. 2 except a point explained below, and therefore, detailed explanation thereof is omitted. The configuration of the terminal device 30 is the same as that of the terminal device 30 in the first embodiment explained using FIG. 3, and therefore, explanation thereof is omitted.

The base station device 20 includes, for example, a determining unit 205 and a measuring unit 206 as illustrated in FIG. 12. The measuring unit 206 measures an interference power in an unlicensed band based on a reception signal output from the FFT processing unit 233. The measuring unit 206 then outputs the measurement result of the interference power to the determining unit 205. The determining unit 205 determines whether the unlicensed band is idle or busy based on the measurement result output from the measuring unit 206. The determining unit 205 then outputs the determination result to the MAC control unit 202.

[Operation of Wireless Communication System 10]

Figure 13:
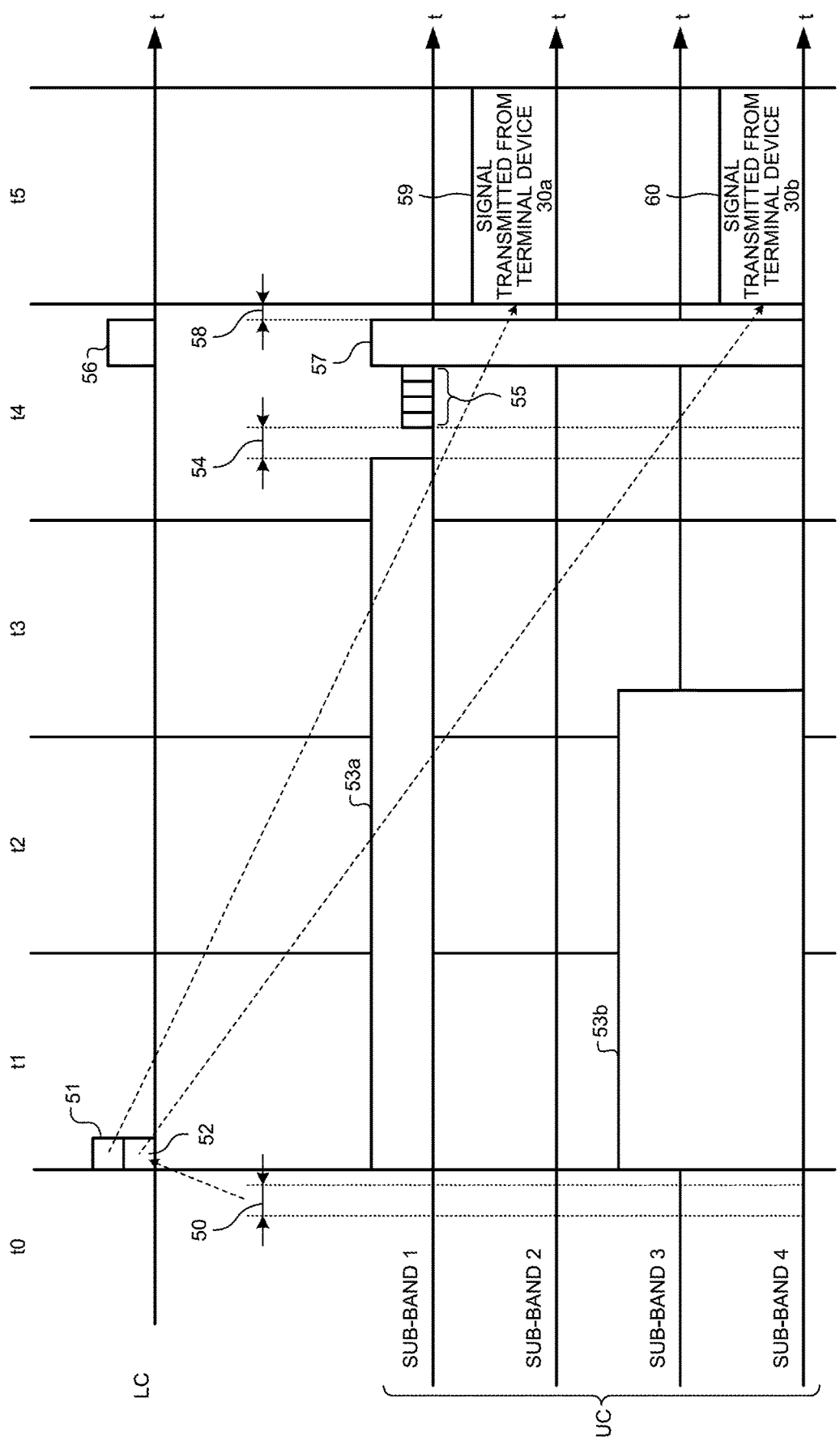
FIG. 13 is a diagram illustrating an operation of a wireless communication system in the fourth embodiment.

FIG. 13 is a diagram illustrating one example of an operation of the wireless communication system 10 in the fourth embodiment.

First, when a data transmission request to the terminal devices 30a and 30b is issued, the MAC control unit 202 of the base station device 20 instructs the determining unit 205 to determine whether a sub-band is idle for all of sub-bands in the unlicensed band. In the example illustrated in FIG. 13, the determining unit 205 determines that all of the sub-bands in the unlicensed band are idle in a period 50 in a subframe periods t0.

When all of the sub-bands in the unlicensed band are determined as idle by the determining unit 205, the MAC control unit 202 generates a UL grant 51 to the terminal device 30a and a UL grant 52 to the terminal device 30b. The MAC control unit 202 then causes the licensed-band transmitting unit 220 to transmit the generated UL grants 51 and 52. The MAC processing unit 305 of the terminal device 30a receives the UL grant 51 transmitted from the base station device 20. Moreover, the MAC processing unit 305 of the terminal device 30b receives the UL grant 52 transmitted from the base station device 20.

In the example in FIG. 13, a signal 53a from another LTE system is transmitted in sub-band 1, and a signal 53b from another LTE system is transmitted in sub-bands 3 and 4.

Subsequently, the MAC control unit 202 instructs the determining unit 205 to determine whether a sub-band is idle for all of the sub-bands in the unlicensed band. The determining unit 205 instructs the determining unit 205 to start the determination whether a sub-band is idle a predetermined time before (for example, one frame before) a transmission start timing specified in the UL grants 51 and 52 for all of the sub-band in the unlicensed band. Note that the MAC control unit 202 can instruct the determining unit 205 to start the determination whether a sub-band is idle for all of the sub-bands in the unlicensed band when transmitting the UL grant.

In the example in FIG. 13, the determining unit 205 determines that all of the sub-bands in the unlicensed and are idle in the subframe period t4. When all of the sub-bands in the unlicensed band are determined as idle by the determining unit 205, the MAC control unit 202 confirms continuation of the idle state during a DIFS 54 and a back-off period 55.

When the continuation of the idle state is confirmed during the DIFS 54 and the back-off period 55, the MAC control unit 202 instructs the licensed-band transmitting unit 220 to transmit an RTS signal 56 that includes identification information of the cell under management of the own device in the licensed band. Thus, for example, as illustrated in FIG. 13, the RTS signal 56 is transmitted in the licensed band. Moreover, when the determining unit 205 determines that the unlicensed band is idle, the MAC control unit 202 instructs the unlicensed-band transmitting unit 210 to transmit an RTS signal 57 that includes the identification information of the cell under management of the own device in the unlicensed band. Thus, for example as illustrated in FIG. 13, the RTS signal 57 is transmitted in all of the sub-bands in the unlicensed band.

The MAC processing unit 305 of each of the terminal devices 30 detects the RTS signal 56 that is transmitted in the licensed band and that includes the identification information of the cell to which the own device belongs, and the RTS signal 57 that is transmitted in the unlicensed band and that includes the identification information of the cell to which the own device belongs. The MAC processing unit 305 then waits until an SIFS (Short Interframe Space) 58 passes after transmission of the RTS signals 56 and 57 is finished. When the SIFS 58 passes, the MAC processing unit 305 of the terminal device 30a instructs the unlicensed-band transmitting unit 330 of the terminal device 30a to transmit a signal 59 of data. Furthermore, the MAC processing unit 305 of the terminal device 30b instructs the unlicensed-band transmitting unit 330 of the terminal device 30b to transmit a signal 60 of data. Thus, in the subframe period t5, the signal 59 from the terminal device 30a is transmitted in sub-band 2, and the signal 60 from the terminal device 30b is transmitted in sub-band 4.

When the independent terminal devices 30 independently perform the LBT at various timings, the timing of determining that the unlicensed band is idle can vary. Therefore, the terminal device 30 that determines the idle state prior to others starts transmission to the unlicensed band, and the other terminal devices 30 are to determine that the unlicensed band is busy, and thus, transmission of the other terminal devices 30 is to be suspended.

On the other hand, in the wireless communication system 10 of the present embodiment, as the base station device 20 performs the LBT, an instruction to start transmission can be sent equally to the terminal device 30 subordinate to the base station device 20. Therefore, it is possible to prevent transmission of the other terminal devices 30 from being hindered by transmission of one of the terminal devices 30, and the throughput of data in uplink of the terminal devices 30 can be improved.

In the present embodiment, the MAC control unit 202 causes the determining unit 205 to perform the carrier sense before transmission of a UL grant; however, the carrier sense is not required to be performed before transmission of a UL grant. Furthermore, in the present embodiment, the MAC control unit 202 transmits the RTS signal to both the licensed band and the unlicensed band; however, the RTS signal is not required to be transmitted to the licensed band. Alternatively, the MAC control unit 202 can transmit the RTS signal to the licensed band, and a dummy signal to the unlicensed band.

Moreover, also in the present embodiment, when a data transmission request to the other terminal device 30 is issued during reception of data from one of the terminal device 30 in the unlicensed band similarly to the third embodiment, the MAC control unit 202 can transmit the second UL grant to the other terminal device 30. Furthermore, also in the present embodiment, similarly to the third embodiment, the MAC control unit 202 can transmit the second UL grant to the terminal device 30 that is not transmitting data, out of the terminal devices 30 having the same transmission start timing that is specified in the first UL grant.

[Operation of Base Station Device 20]

Figure 14:
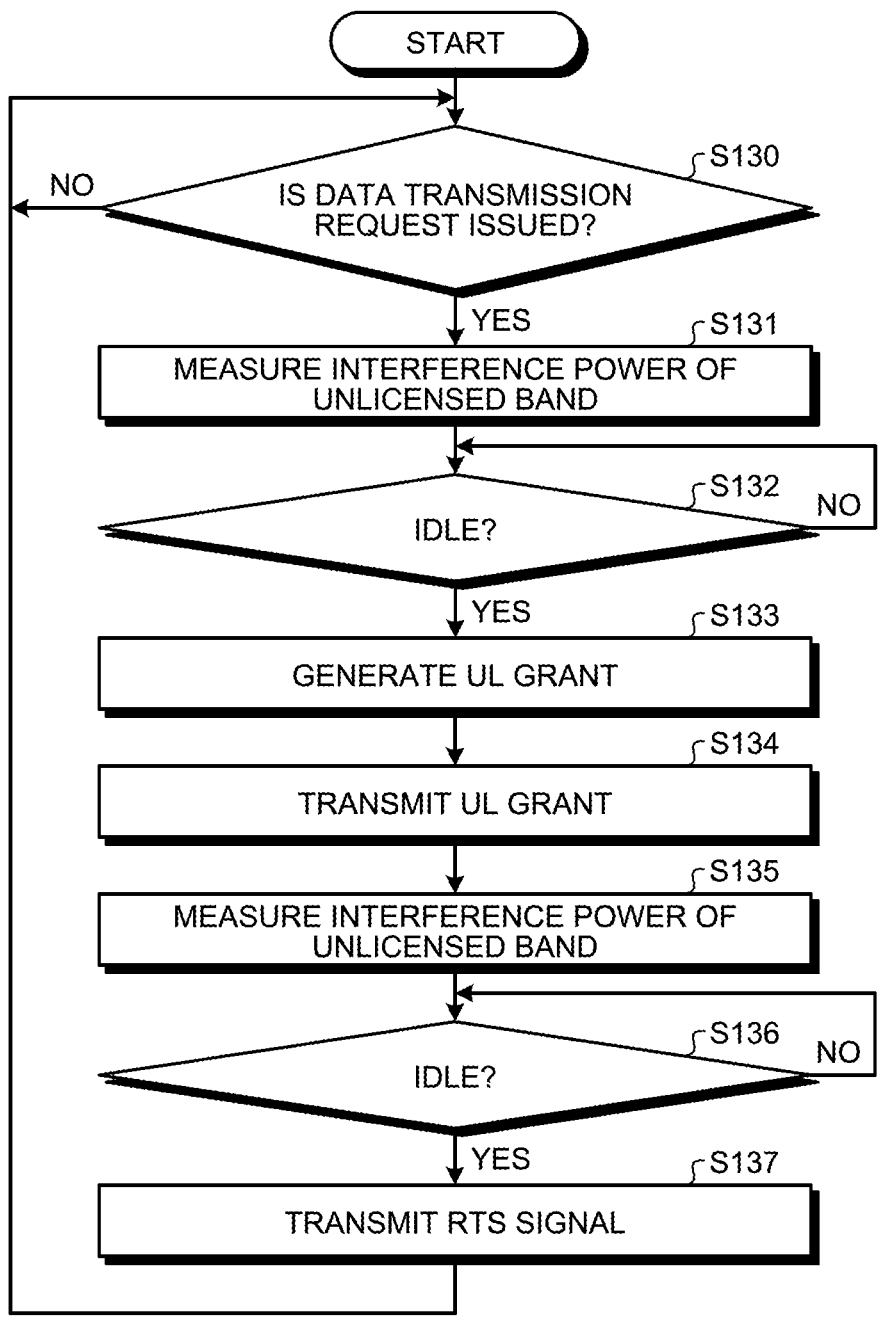
FIG. 14 is a flowchart of one example of an operation of a base station device in the fourth embodiment.

Next, an operation of the base station device 20 is explained. FIG. 14 is a flowchart of one example of the operation of the base station device 20 in the fourth embodiment.

First, the MAC control unit 202 of the base station device 20 determines whether a data transmission request to the terminal device 30 is issued (S130). When a data transmission request to the terminal device 30 has been issued (S130: YES), the measuring unit 206 measures an interference power of an unlicensed band based on a reception signal output from the FFT processing unit 233 (S131). The MAC control unit 202 then instructs the determining unit 205 to start determination whether the unlicensed band is idle. The MAC control unit 202 refers to the determination result output from the determining unit 205, and determines whether the unlicensed band is idle (S132).

When the unlicensed band is idle (S132: YES), the MAC control unit 202 generates a UL grant (S133). The MAC control unit 202 then causes the licensed-band transmitting unit 220 to transmit the generated UL grant (S134). The measuring unit 206 measures an interference power of the unlicensed band based on the reception signal output from the FFT processing unit 233 (S135). The MAC control unit 202 refers to the determination result output from the determining unit 205 to determine whether the unlicensed band is idle, for example, one subframe before the transmission start timing specified in the UL grant (S136).

When the unlicensed band is idle (S136: YES), the MAC control unit 202 instructs the licensed-band transmitting unit 220 to transmit the RTS signal in the licensed band. Moreover, the MAC control unit 202 instructs the unlicensed-band transmitting unit 210 to transmit the RTS signal in all of the sub-bands in the unlicensed band. Thus, the RTS signal is transmitted in the licensed band and in all of the sub-bands in the unlicensed band (S137).

[Terminal Device 30]

Figure 15:
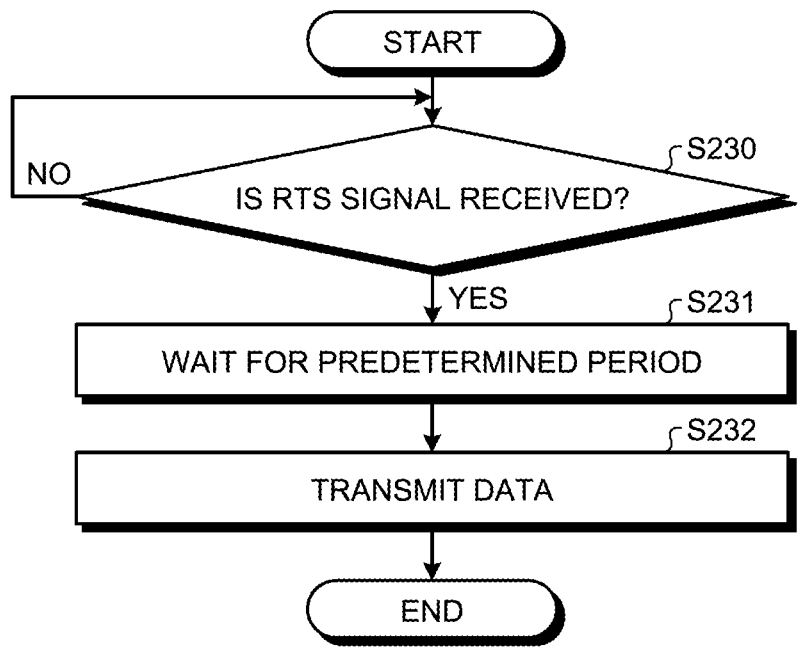
FIG. 15 is a flowchart of one example of an operation of a terminal device in the fourth embodiment.

Next an operation of the terminal device 30 is explained. FIG. 15 is a flowchart of one example of an operation of the terminal device 30 in the fourth embodiment. When the MAC processing unit 305 receives the UL grant, the terminal device 30 starts the operation in this flowchart.

First, the MAC processing unit 305 determines whether the RTS signal is received (S230). When the RTS signal is received (S230: YES), the MAC processing unit 305 waits for a predetermined period until the SIFS 58 passes after transmission of the RTS signal (S231). When the SIFS 58 passes, the MAC processing unit 305 instructs the unlicensed-band transmitting unit 330 to transmit a data signal. Thus, data is transmitted from the terminal device 30 in the sub-band in the unlicensed band specified in the UL grant (S232).

[Hardware]

Figure 16:
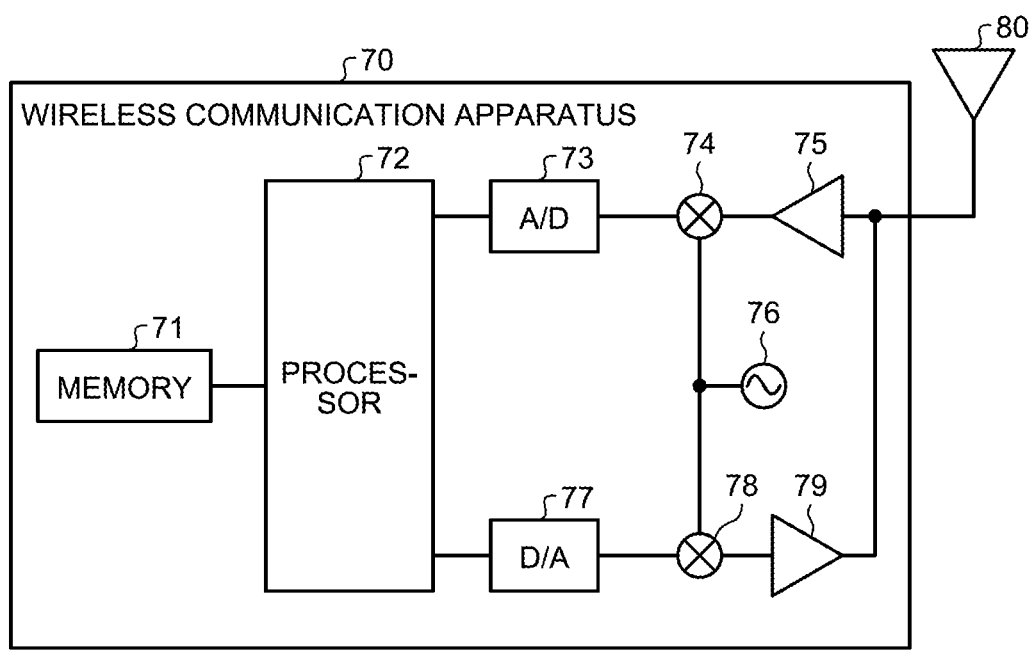
FIG. 16 is a diagram illustrating one example of a wireless communication apparatus implementing functions of a base station device or a terminal device.

The base station device 20 and the terminal device 30 in the respective embodiments described above can be implemented by a wireless communication apparatus 70 illustrated in FIG. 16. FIG. 16 is a diagram illustrating one example of the wireless communication apparatus 70 implementing the functions of the base station device 20 or the terminal device 30. The wireless communication apparatus 70 includes, for example, a memory 71, a processor 72, an analog/digital convertor (A/D) 73, a multiplier 74, an amplifier 75, an oscillator 76, a digital/analog convertor (D/A) 77, a multiplier 78, an amplifier 79, and an antenna 80. Moreover, the wireless communication apparatus 70 can include an interface to perform wired communication with external communication apparatuses in addition to these.

The antenna 80 receives a signal that is wirelessly transmitted from a peripheral of the own apparatus, and outputs the received signal to the amplifier 75. Furthermore, the antenna 80 transmits the signal output from the amplifier 79 to the outside of the own apparatus.

The amplifier 75 amplifies a signal received by the antenna 80. The amplifier then outputs the amplified signal to the multiplier 74. The multiplier 74 multiplies the signal output from the amplifier 75 by a clock signal that is output from the oscillator 76, thereby converting a frequency of the reception signal from a high frequency band to a base band. The multiplier 74 then outputs the signal subjected to frequency conversion to the analog/digital convertor 73.

The analog/digital convertor 73 converts an analog signal output from the multiplier 74 into a digital signal. The analog/digital convertor 73 outputs the digital signal converted from the analog signal to the processor 72.

The processor 72 performs overall control of the wireless communication apparatus 70. The processor 72 can be implemented by, for example, a CPU (Central Processing Unit), a DSP (Digital Signal Processor), and the like. The processor 72 performs reception processing of the signal output from the analog/digital convertor 73. Moreover, the processor 72 generates a transmission signal, and outputs the generated transmission signal to the digital/analog convertor 77.

The memory 71 includes, for example, a main memory and an auxiliary memory. The main memory is, for example, a RAM (Random Access Memory). The main memory is used as a work area of the processor 72. The auxiliary memory is a non-volatile memory such as a magnetic disk and a flash memory, for example. In the auxiliary memory, various kinds of programs to operate the processor 72 are stored. The programs stored in the auxiliary memory are loaded into the main memory to be executed by the processor 72. Furthermore, in the auxiliary memory, for example, various kinds of predetermined thresholds and the like are stored.

The digital/analog convertor 77 converts the digital signal in the transmission signal output from the processor 72 into an analog signal. The digital/analog convertor 77 outputs the analog signal converted from the digital signal to the multiplier 78.

The multiplier 78 multiplies the analog signal converted by the digital/analog convertor 77 by a clock signal that is output from the oscillator 76, thereby converting a frequency of the transmission signal from the base band into a high frequency band. The multiplier 78 then outputs the signal subjected to frequency conversion to the amplifier 79. The amplifier 79 amplifies the signal output from the multiplier 78. The amplifier 79 then outputs the amplified signal to the outside through the antenna 80.

The oscillator 76 generates a clock signal (alternating current signal of continuous wave) at predetermined frequency. The oscillator 76 then outputs the generated clock signal to the multiplier 74 and the multiplier 78.

When the wireless communication apparatus 70 functions as the base station device 20 illustrated in FIG. 2 or FIG. 12, the antennas 216, 226, 235, and 245 can be implemented by, for example, the antenna 80. Moreover, the wireless processing units 215, 225, and 234 illustrated in FIG. 2 or FIG. 12 can be implemented by, for example, the analog/digital convertor 73, the multiplier 74, the amplifier 75, the oscillator 76, the digital/analog convertor 77, the multiplier 78, and the amplifier 79. Moreover, the other components illustrated in FIG. 2 or FIG. 12 can be implemented by, for example, the processor 72 and the memory 71.

When the wireless communication apparatus 70 functions as the terminal device 30 illustrated in FIG. 3, the antenna 300 illustrated in FIG. 3 can be implemented by, for example, the antenna 80. Furthermore, the wireless processing units 311, 321, 331, and 341 can be implemented by, for example, the analog/digital convertor 73, the multiplier 74, the amplifier 75, the oscillator 76, the digital/analog convertor 77, the multiplier 78, and the amplifier 79. Moreover, the other components illustrated in FIG. 3 can be implemented by, for example, the processor 72 and the memory 71.

[Others]

In the respective embodiments described above, when a signal is being transmitted from another system in a sub-band different from the sub-band specified in the UL grant, even if data is transmitted to the sub-band specified in the UL grant, influence on the reception operation of the other system is small. Therefore, the MAC processing unit 305 of the terminal device 30 can perform data transmission when the interference power is smaller than the determination threshold in the sub-band specified in the UL grant. When the interference power in the sub-band specified in the UL grant is equal to or larger than the determination threshold, the MAC processing unit 305 of the terminal device 30 can suspend data transmission.

Furthermore, in Equation (1) in the first embodiment described above, a transmission power is calculated by using the interference power of the entire band in the unlicensed band and the determination threshold; however, the disclosed technique is not limited thereto. The MAC processing unit 305 can calculate the transmission power, for example, by using an interference power that is measured by the measuring unit 302 in a sub-band in the unlicensed band specified in the UL grant, the determination threshold, the initial value of the transmission power, and the minimum transmission power.

For example, the MAC processing unit 305 calculates a larger transmission power out of the transmission power that is acquired by multiplying the initial value of the transmission power by a ratio between the interference power and the determination threshold, and the minimum transmission power. The MAC processing unit 305 can instruct the wireless processing unit 331 to transmit data by the calculated transmission power.

Specifically, the MAC processing unit 305 can calculate the transmission power P by using, for example, Equation (2) below.

[Eq. 2]

$$P = \max(P_0^{BW} - P_{measure}^{granted} + P_{th}^{BW}, P_{min}^{BW}) \qquad (2)$$

where
$P_0^{BW}$ (dBm) is an initial value of a transmission power in a frequency band specified in a UL grant,
$P_{measure}^{granted}$ (dBm) is an interference power measured by the measuring unit 302 in a frequency band specified in a UL grant,
$P_{th}^{BW}$ (dBm) is a threshold used to determine whether a frequency band specified in a UL grant is busy, and
$P_{min}^{BW}$ (dBm) is a minimum transmission power in a frequency band specified in a UL grant.

Moreover, in the second to the fourth embodiments described above, the terminal device 30 that performs transmission in the unlicensed band without performing the LBT can perform transmission, for example, by the transmission power calculated based on Equation (1) explained in the first embodiment or Equation (2) above. When the interference power in the sub-band specified in the UL grant is equal to or larger than the determination threshold, the MAC processing unit 305 of the terminal device 30 can suspend data transmission.

The components indicated in the respective embodiments described above are categorized per function according to the main processing, to facilitate understanding of the respective devices. Therefore, the disclosed technique is not limited by the categorization method or the names of the components. The components of the respective devices described above can be categorized into more elements, or can be categorized such that one component performs more kinds of processing. Furthermore, each processing can be implemented by dedicated hardware such as an ASIC (Application Specific Integrated Circuit).

According to one aspect of the embodiment, reduction of a throughput in uplink can be eased.

All examples and conditional language provided herein are intended for the pedagogical purposes of aiding the reader in understanding the invention and the concepts contributed by the inventors to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A wireless communication system that includes a first communication device, and a second communication device, and in which the first communication device and the second communication device wirelessly communicate with each other by using a band dedicated to the wireless communication system, and a band shared with other systems, wherein
the first communication device includes:
a first transmitter that transmits control information to the second communication device by using the dedicated band, wherein the control information indicates a resource in the shared band to transmit data; and
a first controller that determines whether the shared band is idle or busy after the control information is transmitted, wherein
the first transmitter transmits a predetermined signal, different from the control information and including identification information of the first communication device, indicating data transmission permission for the shared band when the first controller determines that the shared band is idle wherein the predetermined signal is transmitted after the control information is transmitted and the first controller determines whether the shared band is idle or busy, and
the second communication device includes
a second transmitter that transmits, without performing sensing, the data using the resource in the shared band indicated in the control information after the predetermined signal is received, wherein
the first controller does not perform determination whether the resource in the shared band is idle or busy, before the first transmitter transmits the control information to other second communication device, while receiving data from the second communication device by using the resource in the shared band,
the first transmitter adds a transmission instruction to the control information that indicates that data transmission is started without performing determination whether the resource in the shared band is idle or busy when transmitting the control information to the other second communication device while data is being received by using the resource in the shared band from the second communication device, and
the second transmitter transmits data, when the transmission instruction is included in the control information, data by using the resource in the shared band specified in the control information.

2. The wireless communication system according to claim 1, wherein
the first transmitter transmits the predetermined signal that includes identification information of a cell under management of own device to the shared band, when the first controller determines that the resource in the shared band is idle, and
the second transmitter transmits, when receiving the predetermined signal that includes the identification information of the cell to which own device belongs, the data by using the resource in the shared band specified in the control information.

3. The wireless communication system according to claim 1, wherein
the second communication device further includes a second controller that measures an interference power in the shared band, and
the second transmitter transmits the data with a transmission power that is a larger one out of a transmission power acquired by multiplying an initial value of a transmission power by a ratio of the interference power to a threshold used to determine whether the resource in the shared band is busy, and a minimum transmission power.

4. The wireless communication system according to claim 1, wherein
the second communication device further includes a second controller that measures an interference power in the resource in the shared band specified in the control information, and
the second transmitter transmits the data when the interference power measured by the second controller is smaller than a threshold used to determine whether the resource in the shared band specified in the control information is busy.

5. The wireless communication system according to claim 1, wherein
the second communication device further includes a second controller that measures an interference power in the resource in the shared band specified in the control information, and
the second transmitter transmits the data with a transmission power that is a larger one out of a transmission power acquired by multiplying an initial value of a transmission power by a ratio of the interference power to a threshold used to determine whether the resource in the shared band specified in the control information is busy, and a minimum transmission power.

6. The wireless communication system according to claim 5, wherein the second transmitter transmits data when the interference power is smaller than the threshold.

7. The wireless communication system according to claim 1, wherein the first controller determines whether the shared band is idle or busy according to transmission timing indicated by the control information.

* * * * *